United States Patent
Velevski et al.

(10) Patent No.: US 11,704,850 B2
(45) Date of Patent: Jul. 18, 2023

(54) SYSTEM FOR TRANSMITTING AND VIEWING A SERIES OF IMAGES

(71) Applicants: AUCKLAND UNISERVICES LIMITED, Auckland (NZ); FORMUS LABS LIMITED, Auckland (NZ)

(72) Inventors: Antonije Velevski, Auckland (NZ); Ju Zhang, Auckland (NZ)

(73) Assignee: Formus Labs Limited, Auckland (NZ)

( * ) Notice: Subject to any disclaimer, the term of this patent is extended or adjusted under 35 U.S.C. 154(b) by 0 days.

(21) Appl. No.: 16/603,177

(22) PCT Filed: Apr. 9, 2018

(86) PCT No.: PCT/NZ2018/050047
§ 371 (c)(1),
(2) Date: Oct. 4, 2019

(87) PCT Pub. No.: WO2018/186758
PCT Pub. Date: Oct. 11, 2018

(65) Prior Publication Data
US 2020/0043214 A1    Feb. 6, 2020

(30) Foreign Application Priority Data

Apr. 7, 2017 (NZ) ........................................ 730893
Aug. 22, 2017 (NZ) ........................................ 734860

(51) Int. Cl.
*G06T 11/60* (2006.01)
*G06T 15/08* (2011.01)
*H04N 1/00* (2006.01)

(52) U.S. Cl.
CPC .............. *G06T 11/60* (2013.01); *G06T 15/08* (2013.01); *H04N 1/00209* (2013.01); *H04N 1/00244* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 7,170,521 B2* | 1/2007 | Chylla | ................ | H04N 1/2187 345/530 |
| 8,600,193 B2 | 12/2013 | Kalayeh | | |
| 9,633,483 B1* | 4/2017 | Xu | ........................... | G06T 17/10 |
| 2005/0184988 A1* | 8/2005 | Yanof | ..................... | G06T 17/00 345/424 |
| 2007/0099147 A1* | 5/2007 | Sachdeva | ............. | A61C 9/0046 433/24 |
| 2007/0171238 A1* | 7/2007 | Ubillos | ................. | G06F 3/0481 345/648 |
| 2008/0069458 A1* | 3/2008 | Vega-Higuera | ......... | G06T 15/08 382/232 |

(Continued)

OTHER PUBLICATIONS

PCT International Search Report & Written Opinion, International Application No. PCT/NZ2018/050047, dated Jul. 17, 2018, 16 Pages.

*Primary Examiner* — Yingchun He
(74) *Attorney, Agent, or Firm* — WTA Patents

(57) ABSTRACT

A method of transmitting a series of 2-D images relating to a 3-D object or model between a server and a user terminal includes combining each of the 2-D images in the series of 2-D images into a single combined 2-D image, and transmitting the combined image to the user terminal.

16 Claims, 14 Drawing Sheets

(56) References Cited

U.S. PATENT DOCUMENTS

| | | | |
|---|---|---|---|
| 2008/0140722 A1* | 6/2008 | Jakobovits | G16H 30/40 |
| 2013/0129243 A1* | 5/2013 | Natanzon | G06F 3/0485 |
| | | | 382/239 |
| 2014/0334696 A1* | 11/2014 | Gholap | G06T 3/4038 |
| | | | 382/128 |
| 2015/0052471 A1 | 2/2015 | Chen et al. | |
| 2015/0221116 A1 | 8/2015 | Wu et al. | |
| 2015/0339268 A1* | 11/2015 | Bednarz, Jr. | G06F 40/14 |
| | | | 715/248 |
| 2016/0035102 A1 | 2/2016 | Jerebko | |
| 2016/0335742 A1* | 11/2016 | Yim | G01R 33/5608 |
| 2017/0039322 A1* | 2/2017 | Reicher | G06F 16/583 |
| 2017/0323436 A1* | 11/2017 | Foland | G06T 11/008 |
| 2018/0276785 A1* | 9/2018 | Wang | G06N 20/00 |

\* cited by examiner

SYSTEM FOR TRANSMITTING AND VIEWING A SERIES OF IMAGES

CROSS-REFERENCE TO RELATED APPLICATIONS

This application is the National Stage of International Application No. PCT/NZ2018/050047, filed Apr. 9, 2018, which claims the benefit of and priority to New Zealand Patent Application Serial No. 730893, filed Apr. 7, 2017, and New Zealand Patent Application Serial No. 734860, filed on Aug. 22, 2017, which are incorporated by reference in their entirety.

FIELD OF THE INVENTION

The present invention relates generally to imaging and in particular to the communication of large numbers of images between a server and user terminal. In particular the present invention relates to transmission of a series of images efficiently.

BACKGROUND

The development of modern technologies such as digital cameras, digital imaging techniques and the automation of these techniques has led to the proliferation of large image data sets which must be stored, transmitted and reviewed. 3-D digital models are routinely interactively displayed on 2-D display hardware, e.g. computer monitors or smart phones by a variety of software such as games and CAD programs. In these cases, the 3-D model is stored locally on the device. Interactivity is important for viewing 3-D models on 2-D displays because only by rotating the model can the user see the full 3-D object.

Viewing 3-D models that are stored remotely, e.g. over a network connection, presents some technical and commercial challenges. Technically, transmitting a 3-D model over the network can be time consuming given the size of a model. More importantly, on the client device, the 3-D model is often accessed through a web-browser which has limited 3-D rendering ability. Commercially, it may not be desirable to transmit a 3-D model to the client device from an intellectual property perspective. With cheap 3-D printing, a client can download the 3-D model and potentially reverse engineer and manufacture a product. Due to the above challenges, 3-D models of products are often not available to view interactively on websites, especially models of commercial products for sale online. However, it is often still desirable for remote users (e.g. customers) to view the 3-D model, e.g. for marketing purposes. Therefore, the challenge is to allow remote interactive viewing of 3-D models without transmitting the 3-D model itself.

A common solution is to pre-render "views" of a 3-D object in a variety of orientations or dispositions, and display these views and image files on a webpage.

The main limitation of current implementations of this solution is that the views are only of the object rotating about 1 axis, e.g. an object spinning around. Due to the sizes of multiple view images, the number of views is also often limited. Current solutions also suffer from user-interface latency due to loading and displaying multi images of different views.

Another field where remote viewing of image sets is relevant is in medical images, obtained from a medical scanner such as an MRI. In many cases it is necessary or at least preferred that medical images are viewed by a doctor or skilled person who is remote from where the images are collected. This typically requires communication of the images from a server to a user terminal. Preferably images should be able to be viewed on standard desktop and mobile devices anywhere using any communication network, including an internet connection.

This is made difficult because of the large nature of many image sets. For instance a typical 3-D medical image set such as a CT scan along a person's leg may consist of a stack of hundreds of 2-D images or slices which together may be referred to as a 3-D image stack. Each of these images may be hundreds of kilobytes each, resulting in a total of 100 Megabytes or more. Transmitting this large amount of data is relatively slow using prior conventional methods, whether transmitted individually or as a whole, and can also mean that they are cumbersome to transmit. It is important that the user, be it a doctor or a patient is able to view successive images in the stack in a smooth sequential manner to comprehend the imaged 3-D structures from the series of 2-D images.

US 20080140722 shows a system for interactively viewing and retrieving medical images between a server and client device. This system begins by downloading the set of images, or a subset of required images. Logic may be used to decide if or when to retrieve further images. This system allows viewing of a 3-D image stack over the internet but the individual requests for individual or groups of image slices, or for the whole image stack, to be sent as a collection of individual images are problematic. This approach leads to lag time as the user scrolls through the stack, creating a potentially unresponsive user interface and hindering the user's comprehension of the imaged 3-D volume. If a low resolution is used initially the system must download each image again at high resolution.

U.S. Pat. No. 8,055,636 shows a system in which a group of images are formed into a 'static' web page. This appears to mean that the full images are placed on a single page prior to access by a user. This allows a simple user terminal to access the webpage and download the images for review and means only a single webpage needs to be loaded. However the use of a static webpage with each of the images does not address the problem of the number of images which must be downloaded. There will still be a delay as each image is downloaded, as part of the webpage, to the user terminal.

US20070035551 shows the viewing a plurality of images on a display, in particular where a modern camera has taken a large number of digital images. This system uses stacks of images which may be recognised by a chosen or picked image, which is displayed at the top of the stack. When a stack is chosen a plurality of stack images must be downloaded or obtained to display each of the images. The means that a large amount of data must be downloaded, stored, and manipulated on the client's device which creates an initial lag time and a potentially unresponsive user interface on older or mobile devices with limited hardware resources as the user scrolls through the stack.

U.S. Pat. No. 9,092,551 shows a method of reducing the display of images by a radiologist selecting one or more key images to form a montage. The images may be chosen from the several hundred in an image series. The same image may be chosen more than once but with a different characteristic chosen. The montage images may be chosen as separate files, or as a combined screenshot. This method reduces the amount of data to be transmitted by limiting the number of images displayed. However this method requires that a skilled user select relevant images and does not make all images available at the user terminal.

In addition, existing methods often leverage additional software such as plugins (e.g. Flash or Java) to render the images, creating potential security, compatibility and hardware resource issues. Therefore there is a need to provide a system for image transfer and review which provides a relatively quick and preferably low latency system for the review of large numbers of images, or image stacks.

OBJECT OF THE INVENTION

It is an object of the present invention to provide a method and/or system for sending and/or viewing 3-D images which addresses any one or more of the above problems. Alternatively it is an object of the invention to provide method and/or system for sending and/or viewing 3-D images which improves the speed or reduces the latency of previous systems. It is a further alternative object of the invention to at least provide the public or the industry with a useful choice.

BRIEF SUMMARY OF THE INVENTION

In one aspect the present invention may be broadly said to consist in a method of transmitting a series of images between a server and a user terminal, the method comprising the steps of:
Obtaining a combined image from the series of images; and
Transmitting the combined image to the user terminal.

The present method automatically turns a series of images into a combined image. That is a single image containing each of the plurality of images as constituent parts. A series of 2-D images is used which allows the connection between each image to be known when transmitted providing further information than a random, or partially random collection of images. This method has the advantage of only requiring one (large) combined 2-D image to be transmitted. This requires a single call from a user terminal (or push from the server) and allows improved compression using many known techniques (such as jpeg or GIF). Therefore the server can provide an image more effectively than prior art methods.

In an embodiment the series of images comprises image slices of a 3D volume or 3-D model. Preferably the series of images form a 3-D volume when stacked together. In another embodiment the series of images is of a 3-D model in selected orientations or dispositions. The series of images may be provided in a sequential manner along an axis or about an axis.

In an embodiment the method comprises the steps of:
Obtaining a plurality of combined images, each of the plurality of combined images comprising a series of image planes or image slices along an axis. Preferably the axis is through a 3-D volume.

In an embodiment the axes (or image planes) are orthogonal. In an embodiment the axes (or image planes) represent a dimension of the series of images (e.g. an orthogonal length or time).

In an embodiment each of the series of image planes are generated from an original series of images. In an embodiment the method of generating a series of image planes comprises the steps of:
Forming a voxel array from the original series of images;
Obtaining a series of images planes along an axis.

The proposed method allows a single set of images to be used to form a series of combined images. Preferably these are orthogonal so that the user could, for instance, review or select between sagittal, coronal and axial views of a CT scan. Because of the efficiency of supplying each of these in a combined image these may be supplied with low latency. Alternative series of images could be provided or obtained in each of the desired views or axes.

In an embodiment the method comprises the step of:
Sampling the series of images prior to obtaining a combined image; and
Wherein the sampling reduces the size of the formed or combined image.

In an embodiment sampling comprises selecting 1 of each n images where n is an integer. In an alternative embodiment sampling comprises selecting n images in total, where images may be obtained by interpolating between the series of images. In an alternative embodiment sampling comprises selecting a spacing between the series of images. In a preferred embodiment the series of images is formed into a voxel array before sampling occurs. Thus the voxel array may be sampled to derived a required series of images.

In an embodiment the number of images (n) is automatically determined or manually selected. In an embodiment a plurality of combined images are formed, each combined image having a different sampling or number of images. In an embodiment 3 combined images are formed having a low, medium and high sampling.

Sampling can be used to, for instance to select every second image, to reduce the overall size.

In an embodiment the method comprises the step of:
Adjusting a characteristic of one or more of the series of images; wherein the characteristic is substantially equalised or normalised across the series of images.
In an embodiment the characteristic is any one or more of:
Image size, shape or geometry;
Image contrast;
Image quality;
An element or overlay in the image; and/or
Image pixel values.

Images having known (and consistent) characteristics, such as size or shape over the series of images allows information about the image required by the user terminal (if any) to be reduced. Normalising characteristics such as contrast and quality means consistency across the combined image, possible improved compression, and improved visibility of objects of interest to the user.

In an embodiment the combined image is transmitted or stored in a compressed image format, such as jpeg or gif.

In an embodiment the method comprises the step of introducing a feature such as a demarcation feature to any one or more of the images. In an embodiment the feature may be any one or more of:
A separation device, such as a border;
Text;
A 3D model outline;
An indicator; and/or
A reference number.

The introduction of a feature to any one or more, but preferably all, of the images allows including a reference to each image (e.g. location, or some identifier (such as patient details) to be included. Alternatively, or in conjunction, the feature may help to demarcate images (for instance a line, border or shading.

In an embodiment the step of forming the images into a combined image comprises arranging the series of images into an order. In an embodiment the order is a progression from the top left to bottom right.

In an embodiment the step of obtaining the combined image comprises any one or more of the steps of:
Initialising a combined image;

Inserting each of the series of images into the combined image; and

Saving the combined image to memory.

In an embodiment the step of obtaining the images into a combined image comprises stitching the images together. Alternatively the step comprises obtaining a montage or mosaic of the images. In an embodiment the images are arranged in ordered rows and/or columns. Preferably there is no overlap between images. In some embodiments a dividing means is combined between images or rows and/or columns of images.

In an embodiment the number of rows and/or columns is selected so as to make the combined image substantially square, or as square as possible. Preferably the combined image is rectangular and the ratio of length and width of the rectangle is approximately 1. Preferably the length and width differ by less than 20 percent, 10 percent, 5 percent or 1 percent.

In an embodiment the method comprises the step of receiving a request for a combined image from a user terminal.

In an embodiment the method comprises the step of inserting an overlay in the combined image. In an embodiment the step of inserting an overlay comprises the step of inserting an outline or shading on each of the series of images. In an embodiment the overlay is applied directly to the 3D model (e.g. a voxel array) of the series of images. In an embodiment the overlay is a model of a medical device or body to be inserted.

In an embodiment the method comprises the step of receiving a request from the user terminal to insert an overlay. In an embodiment the request provides characteristics of the overlay.

In an embodiment the method comprises the step of obtaining and/or storing information or characteristics of the image for transfer to the user terminal. In an embodiment the characteristics include any one or more of:
  Image(s) width;
  Image(s) height;
  Number of slice;
  Number of rows;
  Number of columns;
  Patient information;
  Image layer (base or overlay name);
  Image data, including scaling values or a reference scale; and/or
  Physical image data.

In an embodiment the method comprises the step of receiving a point selection from the user terminal.

In an embodiment the method comprises the step of converting the point selection into a corresponding point on one of the original series of images.

In an embodiment the method comprises the step of receiving a plurality of points selected from the user terminal. In an embodiment the plurality of points are used to define a region of interest in the series of images. In an embodiment the method comprises the step of obtaining a combined image of a series of images in the region of interest. In an embodiment the method comprises the step of obtaining a combined image of a series of images along the axis of the region of interest.

In a further aspect the present invention may be broadly said to consist in a method of displaying a combined image received by a user terminal, the combined image comprising a series of images, the method comprising the steps of:

Obtaining size characteristics such as dimensional data for each of the series of images in the combined images; and
  Displaying a portion of the combined image on the user terminal, the portion comprising at least one of the series of images.

The present method allows a user terminal to view a series of images while relying on a single image. This is achieved by recognising that the single image is constructed or formed from the series of images, preferably arranged in a regular grid or array. Knowledge of the size characteristics of the each of the series of images can be used to allow the user terminal to display a single image. This means that the user terminal can display any one of the series of images while needing only to request or call the combined image. This greatly reduces any delay in retrieving images and allows low latency in moving between images.

In an embodiment the portion comprises one of the series of images.

In an embodiment the method comprises the step of receiving a signal or instructions, for example from a graphical user interface, from the user to change the displayed portion;
  Wherein the image is translated so as to display a different portion of the image to the user.

In an embodiment the step of receiving a signal is received from the user by a widget such as a scroll bar.

In an embodiment the size characteristics are constant for each of the series of images, wherein the size characteristics of a single image allow the method to obtain the size characteristics of the series of images. In an embodiment the characteristics include any one or more of:
  Image(s) width;
  Image(s) height;
  Number of slice;
  Number of rows; and/or
  Number of columns.

In an embodiment the method is a method implemented on a web page or portal. In an embodiment the web page or portal comprises a display container. In an embodiment the portion of the image is displayed within the display container.

In an embodiment the user terminal displays a plurality of display containers. In a preferred embodiment each of the display containers displays images from different axes.

In an embodiment at least one display container displays an image related to the image displayed in the or a remaining container(s). In an embodiment the displayed image is a plane through a point noted on the or a remaining container(s). In an embodiment the images are moveable between the display containers. The display containers may be differently sized or arranged.

In an embodiment the method comprises the steps of:
  Receiving a point selection from a user of the user terminal;
  Calculating the normalised co-ordinates of the point selection;
  Transmitting or communicating the normalised co-ordinates to the server or source of the combined image.

In a further aspect the present invention may be broadly said to consist in a method of displaying a combined image received by a user terminal, the combined image comprising a series of images, the method comprising the steps of:
  In a first state displaying a first portion of the combined image on the user terminal; and
  In a second state displaying a second portion of the combined image on the user terminal; wherein The first and second portions comprise at least one of the series of images and the user terminal allows a user to move from the first to second state.

In a further aspect the present invention may be broadly said to consist in a method of transmitting a series of images from a server for display on a user terminal, the method comprising the steps of:

Requesting a series of images on the user terminal;
Instructing a server to form the series of images into a combined image;
Receiving the combined image at the user terminal;
Displaying a portion of the combined image on the user terminal, the portion comprising at least one of the series of images.

In further embodiments the method includes any one or more of the embodiments included above.

In a further aspect the present invention may be broadly said to consist in a system for reviewing a series of images, the system comprising:

A server means comprising:
A memory for storing the series of images; and
A processing means for processing the stored images; and
A user terminal in communication or able to communicate with the server; and Wherein when a request is communicated from the user terminal to the server means the processing means selects the series of images and forms a combined image; the combined image being communicated to the user terminal.

In an embodiment the system comprises an imaging means for obtaining the series of images.

In an embodiment the user terminal comprises a control means for selecting or interacting with the combined image and/or a portion thereof.

In an embodiment the memory comprises a plurality of overlays, each of the plurality of overlays representing an object to be combined with the series of images and wherein the processing means can apply each one of the plurality of overlays to the series of images.

In an embodiment the overlay comprises a combined image comprising an overlay image for each of the series of image. In this case the overlay can be transmitted with the combined image to be applied at the user terminal.

In an embodiment the user terminal comprises a display means adapted to display a portion of the combined image. In an embodiment the display means is a web site viewer. In an embodiment the user terminal comprises, or is connected to a pointing device such as a touch screen, mouse, keyboard or equivalent.

In further embodiments the system includes suitable means or apparatus to provide any one or more of the embodiments included above.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

DRAWING DESCRIPTION

A number of embodiments of the invention will now be described by way of examples with reference to the drawings as briefly described below.

DETAILED DESCRIPTION OF PREFERRED EMBODIMENTS

Figure 1:
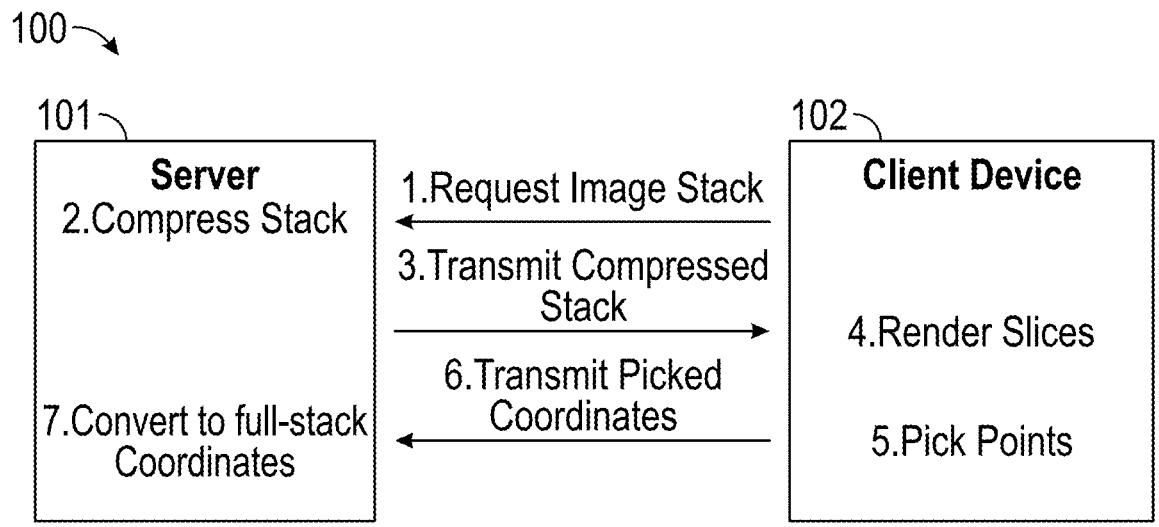
FIG. 1 is an overview of an embodiment of the communication between a server and a user terminal.

Throughout the description like reference numerals will be used to refer to like features in different embodiments.

FIG. 1 shows an overview of one embodiment of the present system 100. It comprises a server 101 and an interactive webpage rendered on a client device or user terminal 102. The server 101 and user terminal 102 may be remote from each other but are connected or connectable by a communication link or means allowing communication 1, 3, 6. The communication means may be a WAN or LAN, including a connection over the internet. The server 101 may be any device having a memory or memory means which is adapted to store data, such as a series of images, and has a processor or processing means capable of acting on the series of images. In some embodiments the memory and processor are in separate devices with a communication link or at least one may be accessed in a remote location. In an alternative embodiment the server, upon receiving an uploaded image series (e.g. from a scanner or a user terminal), constructs the combined image and caches the combined image for future user requests. The caching can be local on the server or on another server e.g. as part of a content delivery network or a server geographically closer to the intended user. In a further example the server and user terminal form the same device, however this may not require the same image latency problem.

The system is designed to reduce the amount of data required to be transmitted between the server 101 and the user terminal 102 when transmitting a series of images. The series of images can be any series of images, for instance a series of images as 2-D image planes separated in distance or time, or a series of views separated by rotational or angular position about one or more axes.

In one example the system and method are suited to facilitating efficient transmission of a series of images or an image stack from a medical imaging device such as a CT or MRI scanner. Alternatively the method is applied to a series of images from a video, separated in time, or a series of images separated in time such as time-lapse photography. However a skilled person would understand that the system and method have broader application including other image series or video screenshots. Broadly the system can achieve improvement by reducing the size of transmitted files and/or by reducing the number of files to be transmitted. In the present invention the method combines the series of images into a single image for transmission and the user terminal 102 displays a portion of this larger (combined) image. The use of a series of images that together form a 3D representation, or time progression, or have a variation in some dimension (e.g. distance or time) allows a viewer to very quickly scan through the series of images to form an impression of the 3D structure. However the viewer also has access to individual images for particular review. This allows a user to form an idea of the 3D shape, or the motion of all of the frames while transmitting the image data efficiently.

The computer or server 101 stores at least one series of images. These may be uploaded directly from an imaging device, uploaded from a user terminal (e g so that the server performs heavy computation on images before they are returned to a user terminal), or may be available or transferred from a memory device. The series of images is generally a plurality of ordered images (for instance an image taken at millimetre increments along the leg of a patient) but may also be a 3-D image which can be divided into a series of image planes (planar cross sections of the 3-Dimensional images. The images may be stored in a compressed format but preferably the server, or an alternative storage means also stores the full quality images for review if required.

When a request for a series of images 1 is received from the user terminal 102 the server 101 can compress the stack by creating or retrieving 2 a combined image or restore a previously compressed stack. The combined image is then transmitted 3 or communicated to the user terminal 102. The combined image may be accompanied with a set of characteristics or variables which enable the user terminal 102 to correctly identify individual images. This enables the user terminal to render or display 4 the 2-dimensional images by selecting and displaying a portion of the combined image. This may be in the form of an interactive webpage on the user terminal 102 contains algorithms that enable a user to request, view, and manipulate an image stack. In an alternative example the images can be rendered in a standalone application on a client device or user terminal 102. This application could communicate with the server independent of a web-browser. In a further embodiment the viewer could even be a dedicated networked device that has physical controls for scrolling through an image series. If required the user terminal 102 can be configured to allow a user to pick 5 or select points, the chosen points can then be communicated to the server 101 and matched or converted 7 to the original images to provide a point location on the high quality images.

Figure 3:
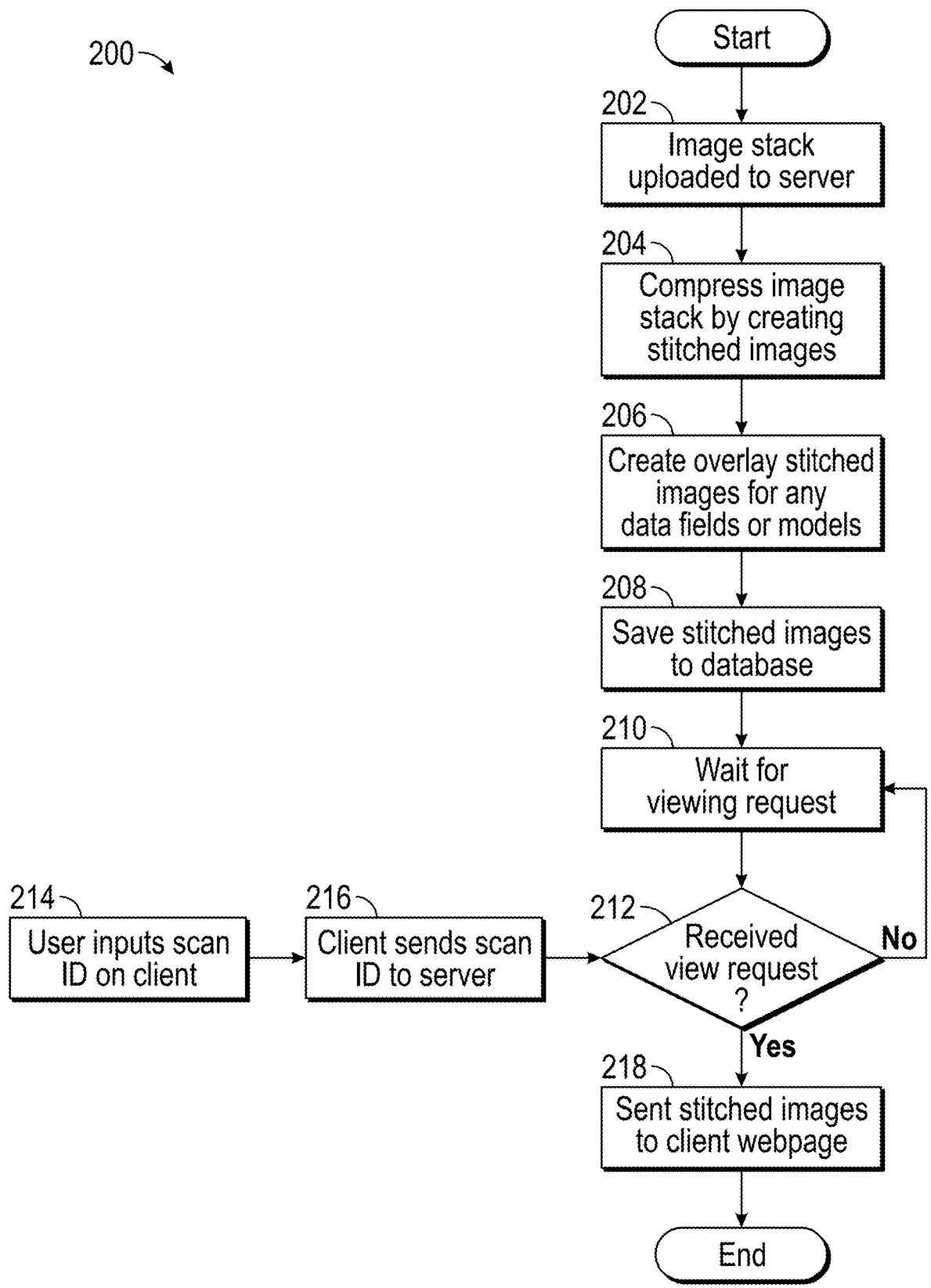
FIG. 3 is a flow diagram of an embodiment of the functionality of the server component.

FIG. 3 shows a flow chart of an embodiment of the present method 200 as implemented on the server 101. In the first step a series of images or an image stack (representing a 3D volume) is uploaded to the server. This may be from a medical image scanner or uploaded through a client-side webpage. This may be performed separately and well before the images are accessed. The server stores the image stack in a memory means or database. The series of images or image stack comprise an ordered plurality of images. The ordering is selected so that it will typically be desirable for a user reviewing the images to be able to scroll between the images to get a 3-D like feel for the subject of the images.

When a request is received from a user terminal, a processor in the server generates 204 the combined image. In alternative embodiments the compressed images can be prepared in advance awaiting a viewing request 210. In a particular embodiment this is achieved mosaicking, montaging or stitching the images together. Preferably this simply means aligning each of the images in an array to form a combined image, however further methods will be explained below. The combined or ensemble image preferably forms an array or a grid type arrangement. Preferably this is regular; however it may be offset or otherwise arranged. The server then generates or obtains forms of the image stack using image stitching. In step 206 the server may select to add on overlay to the combined image. In other embodiments this step may be performed before forming or obtaining the combined images. The compressed forms of the image stack, the combined images or stitched images, may also be stored 208 on the server. When a view request is received the server may check that a scan ID, or other identification means has been received 216 after being uploaded or inserted 214 on the user terminal. This helps to ensure the privacy of any information. Alternative means of authentication will be known to those skilled in the art. If the request 212 and correct authentication is received the combined image(s) is transmitted 218 to the user terminal 102.

Figure 4:
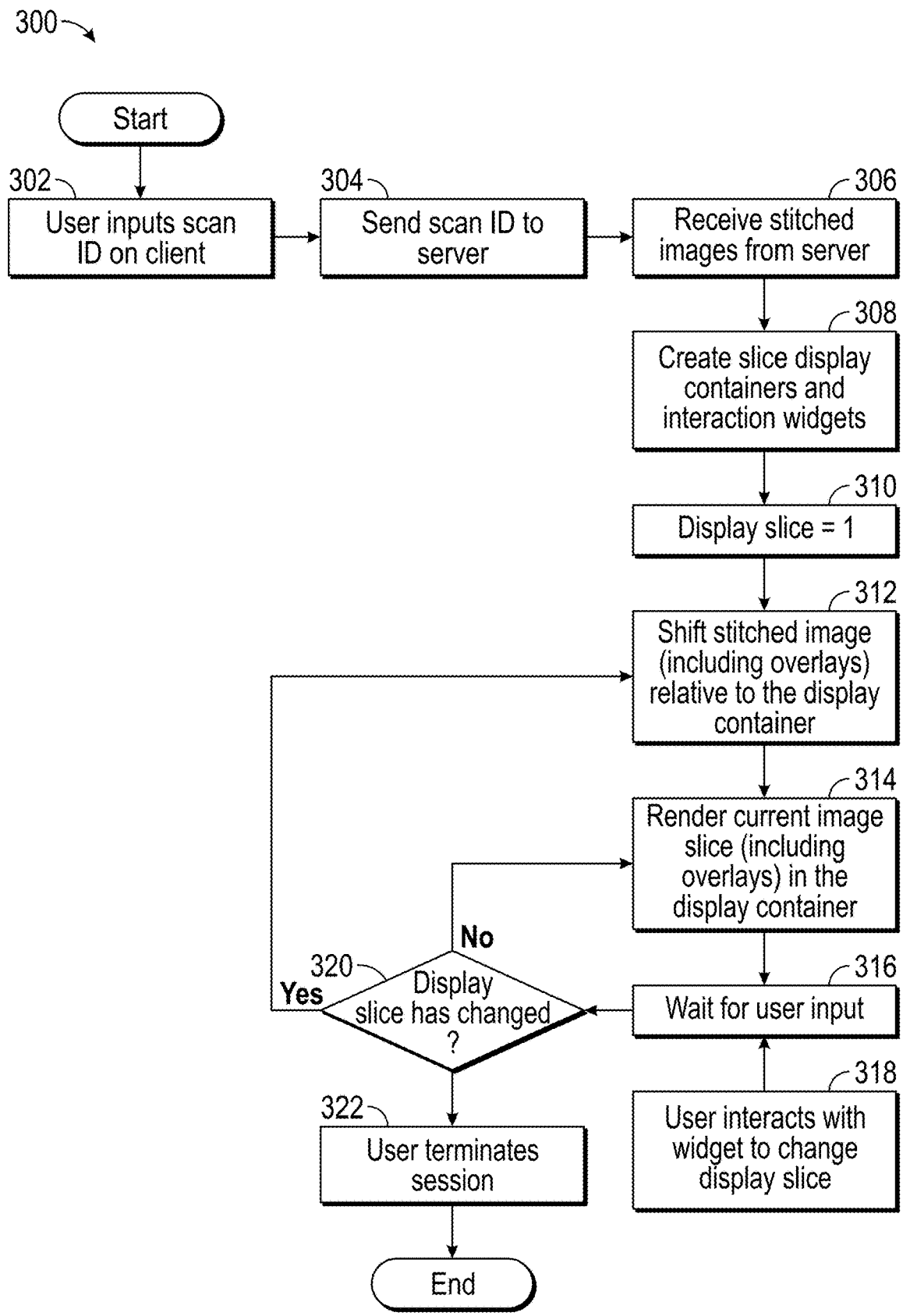
FIG. 4 is a flow diagram of an embodiment of the functionality of the user terminal.

FIG. 4 shows a flow chart of an embodiment of the present method 300 as implemented on the user terminal 102. The user terminal 102 may have a log-in or authentication system for authenticating a user and/or allowing access to particular images on server 101. In the shown embodiment a user inputs 302 a scan ID and sends 304 the scan ID to the server 101 however other authentication options are available. Following a suitable method, for instance as demonstrated in FIG. 3, the user terminal 102 receives 306 a combined image from the server 101. The combined image, or images, includes the series of separate images meshed or stitched together, forming an ensemble or combined image. The user terminal 102, or more exactly a program running on the user terminal 102, can now process the combined image. In a particular embodiment the program is operated in a web-page environment.

The webpage environment is created 308 or loaded has at least one viewing window or display portion for displaying an image. A first image or slice of the combined image is then displayed 310. If required overlay images can also be displayed or rendered on the combined image 314. The first image may be selected from any one of the series of images. The user terminal allows a user to interact 318 with the image, for instance using an interaction device or widget, such as a slider, to change the image. The user terminal may wait 316 for this to occur. If the user terminal requires 320 a new slide based on the interaction the user terminal changes or shifts 312 the portion of the combined image to the appropriate image. This is achieved by a movement of the combined image. The movement may be a translation, and/or a rotation, reflection or scaling. The user terminal 102 calculates the position of the first image, or relative movement required to move between positions and the order of positions. This enables the user terminal to display a, or only the, portion of the combined image which includes the first image. It also enables the user terminal to move between images by adjusting the displayed portion of the combined image, until no longer required by the user 322.

Figure 5:
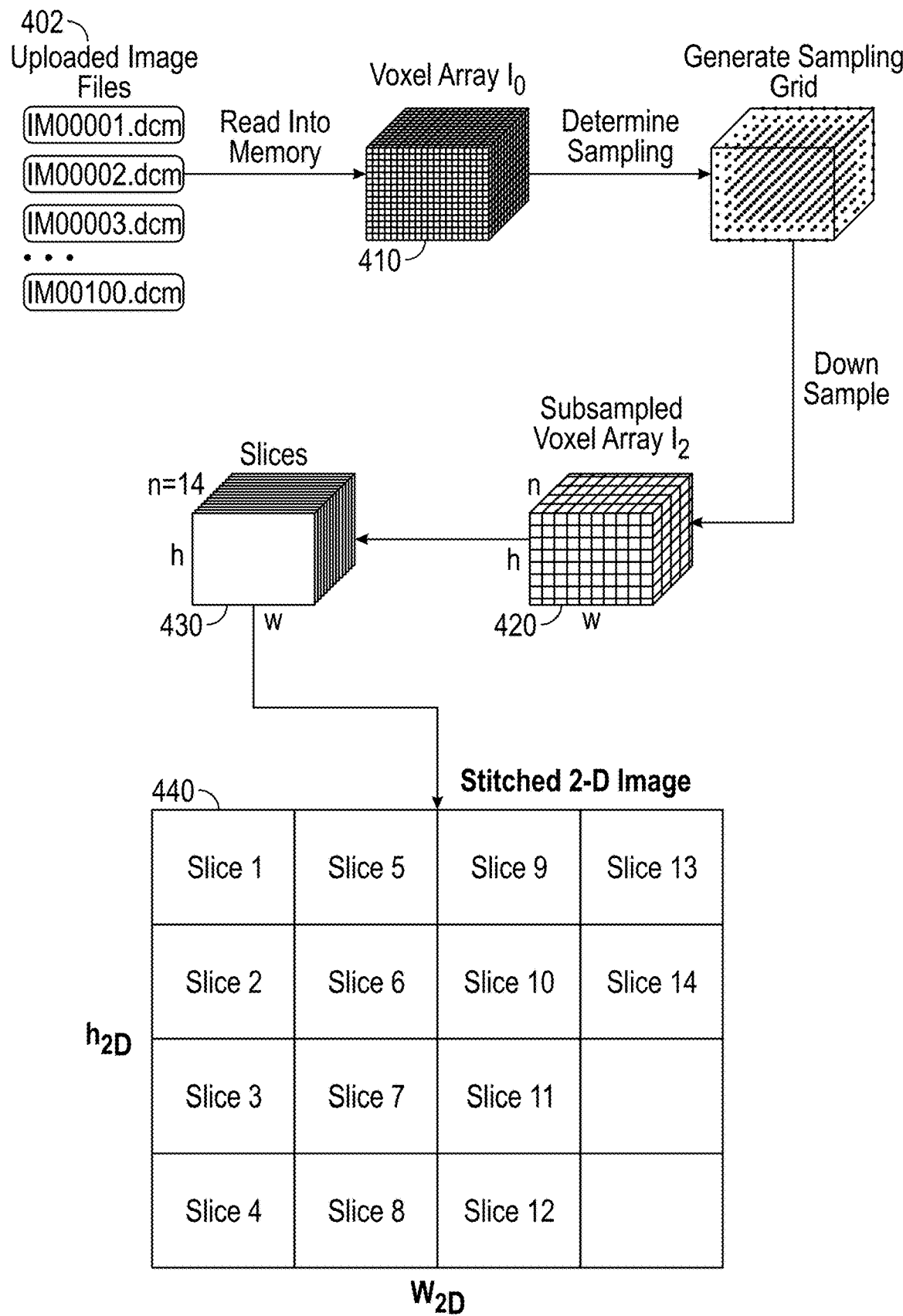
FIG. 5 shows an embodiment of the formation of a combined image.

FIG. 5 shows an embodiment of the formation of a combined image 440 in the present method. A series of original images or image stack 402 are read into or available in memory. In the simplest case these original images, or a subset of these images, may be directly formed into a combined image 440; for instance by selecting 1 of every n image files (or slices) and stitching these together. However in preferred embodiments it is advantageous to form a voxel array 410 or 3-D volume based on the series of pictures. This can provide the ability to produce image sequences in along different axis (e.g. vertical and two horizontal axes of 410) or provide a means to allow interpolation between image files (which allows non-integer sub-sampling). These effects may also be achieved by other means.

Voxel array 410 can be down-sampled by selecting every n image planes (where n is an integer) or by choosing the number of evenly spaced image planes. This choice may depend on a user's request, or preferably a plurality of subsampling steps (e.g. high, medium and low) are performed to allow the user to quickly choose a required image quality in the combined image 440. The subsampled voxel array 420 can then be converted back into image planes or slices 430. These planes could be selected parallel to direction n, h or w, although direction n is shown. The image slices are the stitched together into an image in two dimensions. The server may also generate stitched images of objects to be optionally overlaid on the image stack on the client side.

The embodiment shown in FIG. 5 can be used when a request is received from the user terminal, which may be operating a client web-page. The request preferably includes details of the requested images, such as an ID number and the subsampling or quality of images required. Alternatively subsampling is defined on the server. At some stage in the process it may be advantageous to adjust characteristics of the images. This allows the images to be consistent in any one of shape, size or contrast. For instance the method is preferred when the images are of constant size. Similarly the method may clip and scale voxel values v to be between an upper and lower threshold (e.g. 0 and 255). This attempts to provide consistency or improve contrast in the image series. In a particular embodiment the scaling on a lower value threshold $v_l$ and a window size w. Call this voxel array $I_1$.

$$v_{out} = \begin{cases} 0, & \text{if } v < v_l \\ (v - v_l) \times (w_{out}/w), & \text{if } v_l \leq v \leq v_l + w \\ w_{out}, & \text{if } v > v_l + w \end{cases}$$

where $w_{out}$ is 256. The lower threshold and window size are chosen to provide the best contrast for bone based on knowledge of CT protocols ($v_l$=−500, w=2000). However, these two values can be tuned to highlight other objects, e.g. metal or muscles, and be shown as overlays. Histogram analysis can be used to automatically pick $v_l$ and w for any group of images.

Medical images are typically produced by a CT or MRI machine or image source with constant input parameters. Therefore, there is typically a corresponding image brightness or dynamic range across the images. However in many case the images have a plurality of features. Therefore, it can be advantageous to limit the dynamic range or thresholds to provide a better image of a particular feature. For instance an MRI image may be 16 bit where bone is shown in only a small portion of the 16 bit range. Therefore, if bone is of interest, it is advantageous to map the 16 bit range to the smaller range of bone. This may also allow a reduction to 8 bit images. Similarly constraining the device to a particular area may allow a change in the range to be applied. In some embodiments a plurality of ranges or thresholds are used to provide a plurality of images accentuating different features.

Figure 6:
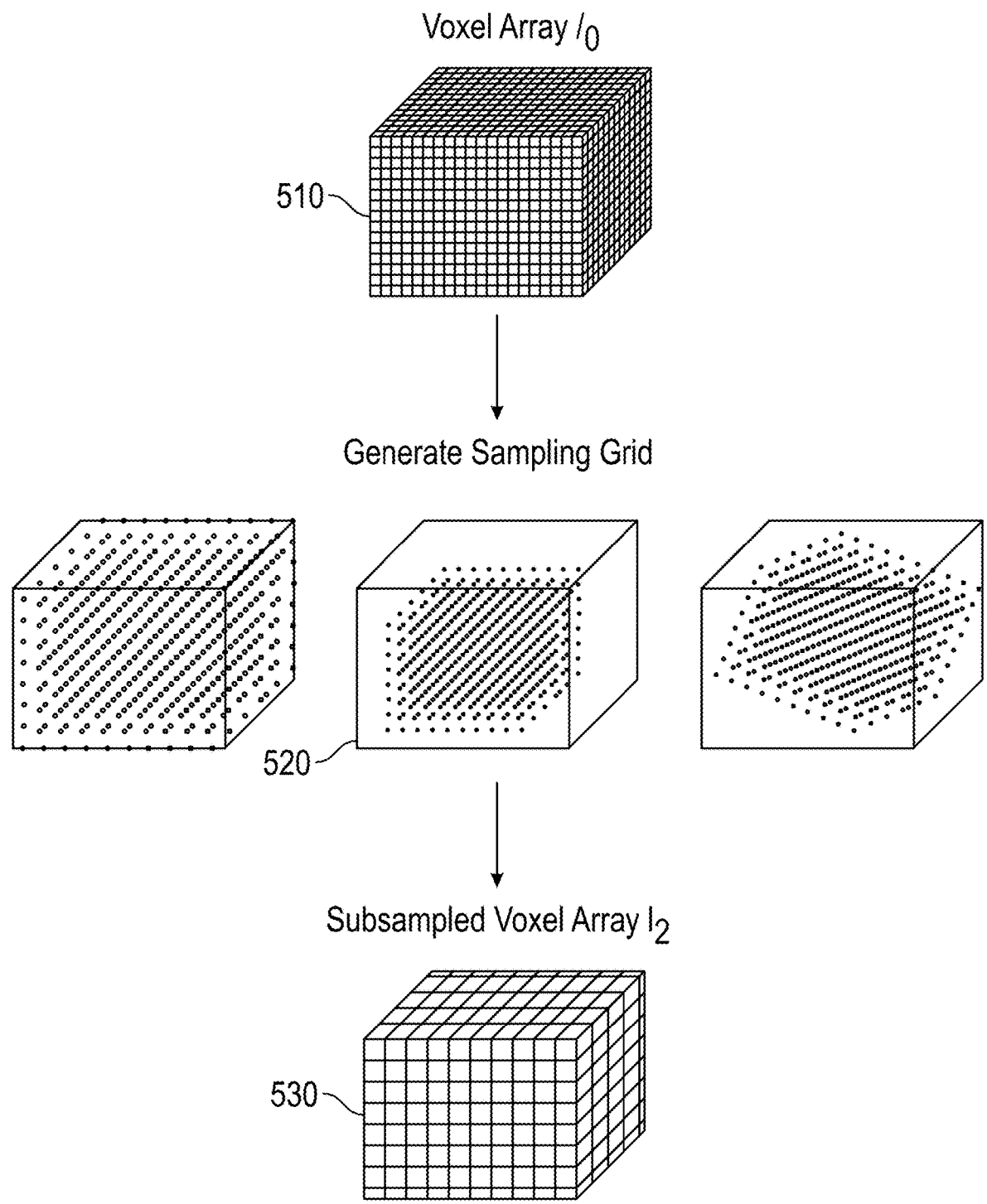
FIG. 6 shows an embodiment of alternative sampling grids.

FIG. 6 shows an alternative resampling of the voxel array 510. In this case the axis of the sampling grid, or image planes, has been modified or rotated to obtain 3 sampling grids 520 which lead to a different subsampled voxel array 530. This may be advantageous where there is a particular feature or orientation of interest to the user. In general the optional resampling of the voxel array 410 allows a user (or may be automatically defined) to adjust the position, orientation, or resolution to produce another voxel array $I_2$. Subsampling can be performed on a regular grid of arbitrary size, density, and orientation. Standard sampling techniques, e.g. polynomial interpolation, can be used.

FIG. 5 also shows the formation of the combined image 440. This combined image slices 430 taken from the sampled array 420. In preferred embodiments the combined image is rectangular, preferably made as square as possible to improve JPEG compression performance. As square as possible means that the ratio between $H_{2D}$ and $W_{2D}$ of 440 is as close to 1 as possible without scaling the image slices. Some variation may be required depending on the relative heights and widths of the individual slices and the number of slices. In a preferred embodiment the, or each, combined image 440 is created by first creating or initialising an empty 2d image. Knowledge of the sizes of the image slices 430, or the series of images allows calculation of the appropriate image size. In preferred embodiments where the image size is constant an empty 2-D image can be calculated to keep the image as square as possible:

Create an empty 2-D image with height of $h_{2D}$ pixels and width of $w_{2D}$ pixels given the number of slices n, slice width w, and slice height h of $I_2$:

$$h_{2D} = \text{ceiling}\left(\sqrt{\frac{n \times w}{h}}\right)$$

$$w_{2D} = \text{ceiling}\left(\frac{n}{h_{2D}}\right)$$

This use of a square or substantially square 2-D image that is as square as possible improves the compression performance of the JPEG format, and many other image formats in which the image may be saved. The creation of a squared stitched image is not essential and other shapes can be used without affecting the principal of the invention. In other embodiments the image may be irregular or circular, or other shaped. In a particular embodiment the images may be arranged in a spiral with a movement between images by rotation.

In a further step the series of images are copied into the initialised image. The series of images 430 are preferably copied in a sequence, although a number of sequences are possible. For instance the sequence may begin with the first slice at the top left corner of the 2-D image and moving down before across. Other forms of ordering are also acceptable, provided there is agreement or communication between the server 101 and user terminal 102 to ensure the correct order or sequence is also displayed. The ordering can be configured to simplify the calculations the client terminal has to make to show successive images from the series. Ordering by rows first then columns is relatively simple. Other ordering would probably result in more complicated and computationally expensive calculations (e.g. to calculate the position of a particular photo a row/column ordering can simply calculate the required column followed by the row). At this stage the combined image is formed and can be stored in memory connected to the server 101 and/or transmitted to the user terminal 102. A plurality of image formats, including compressive formats, are known and may be used. A person skilled in the art could choose an appropriate format.

As explained with respect to FIG. 6 above the axis or axes of the sampling grids 520 may be adapted. It is also possible to change other characteristics of the grid. For instance the orientation, size, and/or position of the sampling grid can either be user define or automatically defined. Manual definition of the axes on the user terminal 102 may require an input or prompt the user to select an option. Alternatively the user of the user terminal may select a region of interest only and the axes may be selected automatically. Automatic image recognition methods can be used to automatically define grid orientation, size, and/or position. Such a method can be used to automatically find an object of interest (e.g. a bone or muscle) in the image and determine its orientation and size. Such information can be used to generate a sampling grid that captures the object, or which provides views along the axis of the object. By selecting a region of interest as described, the system can then generate and display a new combined image of that region at the higher resolution. This, in effect, provides a "zoom" feature. The region of interest can also be used to define the region in which the user would like certain computations to be performed, e.g. some form of image processing.

The density of the subsampling grid 520 can be user defined or automatically determined. The user can define the voxel spacing desired, which determines the spacing between subsampling points. Alternatively the user can specify a number of slices and the spacing can be calculated, or the user can identify the fraction of slices to be used. In an automatic system or otherwise the server can determine (either through calculation/estimation or trial and error) the grid density automatically to produce combined images size in memory. This method is useful to ensure consistent transfer time between the server and client when the network connection has bandwidth restrictions. The calculation may be performed after being given a target combined or stitched image size m in bytes, finding a voxel spacing s such that $$\frac{d_x \times d_y \times d_z}{s^3} \times b \times k \approx m$$

Where $d_x$, $d_y$, $d_z$ are the physical dimensions of the sampling grid along its 3 axes, b is the number of bytes per voxel (typically 1, for 8-bit images), and k is an estimated compression factor that depends on the image format of the stitched image. m is determined by sending a packet of data from the server to the client and measuring the time taken (transfer time), then looking up a table of values of m for a range of transfer times.

An alternative automatic method of determining grid density is to generate a number of stitched or combined images 440 at various grid densities. These densities may correspond to low, medium, high, and ultrahigh image resolutions for example. Then based on the server-client transfer times, client device screen resolution, or user request the server sends the pre-generated stitched or combined image 440 with the most appropriate grid density.

Figure 10:
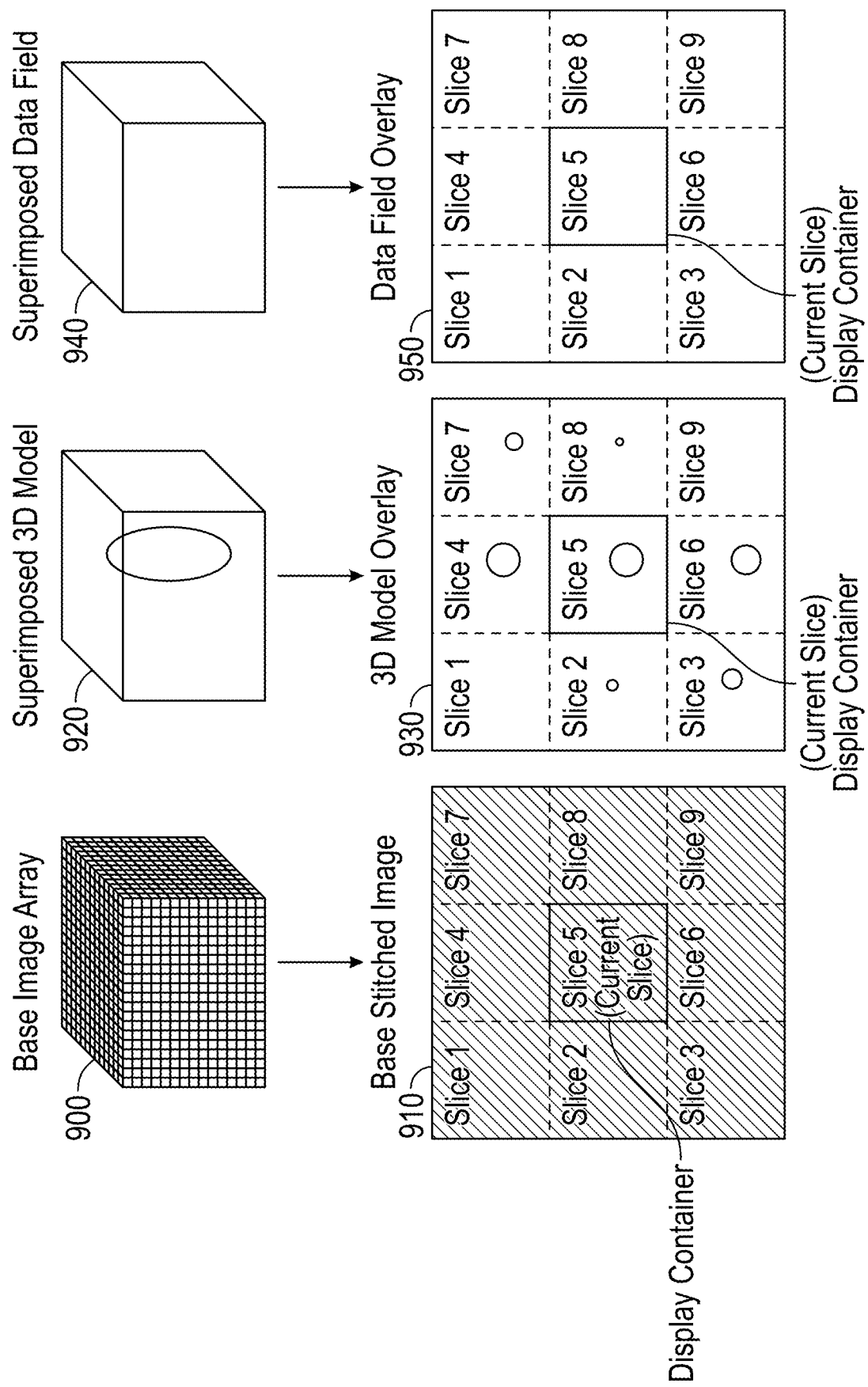
FIG. 10 shows an embodiment of the formation combined image comprising a series of images, 3-D model overlay, and 3-D data file overlay.
Figure 11:
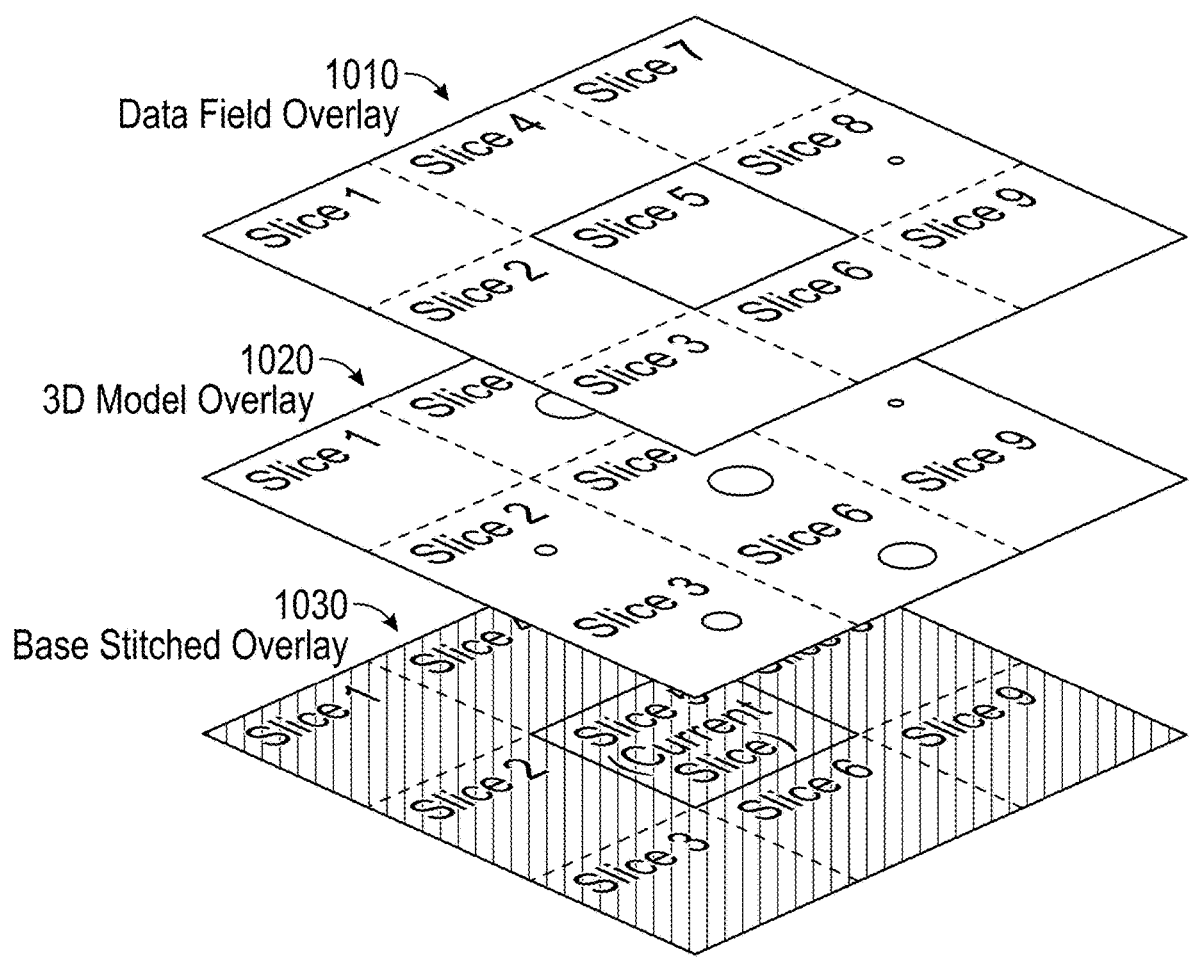
FIG. 11 shows the combined image formed from overlay images rendered as transparent layers on top of the base image.

FIGS. 10 and 11 demonstrate an embodiment of overlays in the system. In the shown embodiment the overlay is created by using separate combined images 910 930 950 for the series of images and each overlay. However it is also possible to fix the overlay by applying it directly to the combined image. The disadvantage of this method is that the combined image 910 must be recalculated if the overlay 930 is to be changed. In the embodiment of FIG. 10 the server 101 generates combined images 930 950 of objects to be overlaid on the base image stack 920. Two possible overlays are shown: a 3d model (for instance some form of medical insert or equipment) and a data field (for instance patient data or data co-registered image of another imaging modality) however other overlays may be used. An overlay may be used where graphical or textual data needs to be shown on medical images, e.g. the outlines of a prosthesis model in its implanted position, shading to highlight regions of anatomy containing an abnormality.

To create each overlay a 3D image or data field 920 940 matching the size of $I_1$ is either provided or in the case of 3-D model, generated from the model. Alternatively a series of images may be created to match with the base or original series of images. This can then follow the process detailed in FIG. 5 to create a combined image. Care may need to be taken that interpolation is correctly handled. The use of a series of images may be desirable for a data field over 950. Alternatively for the insertion of a 3D model it may be easiest to begin with a 3d model 920 in which the model is treated as a 3-D field for which its value is 0 everywhere outside the model and a non-zero value inside the model. If the model is homogenous, the interior field value is 1; otherwise, it is some value that corresponds to some property of the model, e.g. its density or temperature. In an alternative embodiment only part of the field within a small distance of model surface has a non-zero value (for creating model outlines). The sampling and combined image formation parameters of the overlay(s) should match those of the original stitched image 910. Given these sampling parameters the 3-D field of the overlay can be sampled at each grid point to generate a subsampled 3D shape which is discrete or voxelised. The voxelised model can then be sliced to form overlay slices corresponding to each slice of the original combined images.

In embodiments of the system the user terminal 102 allows the user to place object, e.g. click 2 points in the same or different slices to define the path of a screw, or clicking 2 points to define the centre and radius of a sphere. The server 101 can then generate an overlay visualising the placed objects. In an alternative embodiment the terminal allows a user to define an overlay by demarcating a region in the image by clicking around it on the images or filling the region using a paintbrush tool. The normalised coordinates of where the user clicked can be sent to the server which then generates a combined overlay image. This overlay generation functionality allows the user to, for example, segment objects in the image. The resulting overlay image will then essentially be a mask that captures the object of interest. The mask can be used by the server to generate a 3-D model of the segmented object (e.g. using the marching cube algorithm). In a further embodiment the user terminal 102 can be used to define a region in which to overlay some data or model. The server 101 can create a combined overlay image of a data field or 3D model with non-zero data only in the defined region. Multiple overlay embodiments may be available on a user terminal or server.

FIG. 11 shows how the combined image 1030 can now be overlaid by one or more overlays (for instance 3D model 1020 and date field 1010). Because the same techniques have been used the appropriate slices of the 3D model and the data field overlay align with the corresponding combined image (see bordered sub-images in FIG. 11). This system allows a variety of overlays to be used and interchanged if necessary. For instance the 3D model overlay can be prepared in outline, partly shaded or opaque form. Similarly a series of overlays could be constructed to allow a user to view the introduction of medical equipment by moving between overlays. The construction of combined image overlays means that the system does not have to recalculate (and retransmit) the overlay with each movement between image slices. Alternatively the system may allow an object to be positioned in the user terminal, on one of the slices, and reverse this process to obtain a model of the object location in all of the image slices.

The combined images are transferred over the communication link between the server and the user terminal. In some instances the method may be applied where the server and user terminal are the same device. The server preferably communicates at least the combined images. In some embodiments multiple combined images are transmitted, or can be transmitted on request. However to ensure the user terminal can easily reproduce individual or single images the server may provide further data. For each image, or combined image the server may provide date regarding its slice width, slice height, and number of slices. In a particular embodiment all images are the same size so a single values are communicated. In further embodiments additional information may be provided with the image including: patient information, image layer information (such as base or overlay names); Image data including scaling values or a reference scale; and/or physical image data. Substantially any data associated with the images may be useful for a user of the user terminal and included if required. Alternatively it could be included or watermarked on the image itself. This data may be sent as a JSON object or XML object, although other formats can also be used. Alternatively or in addition the server may communicate the number of rows and columns of image slices in each combined image. This can provide a second check of the data as the method can be vulnerable to errors in calculating the position of individual images in the combined image.

Figure 7:
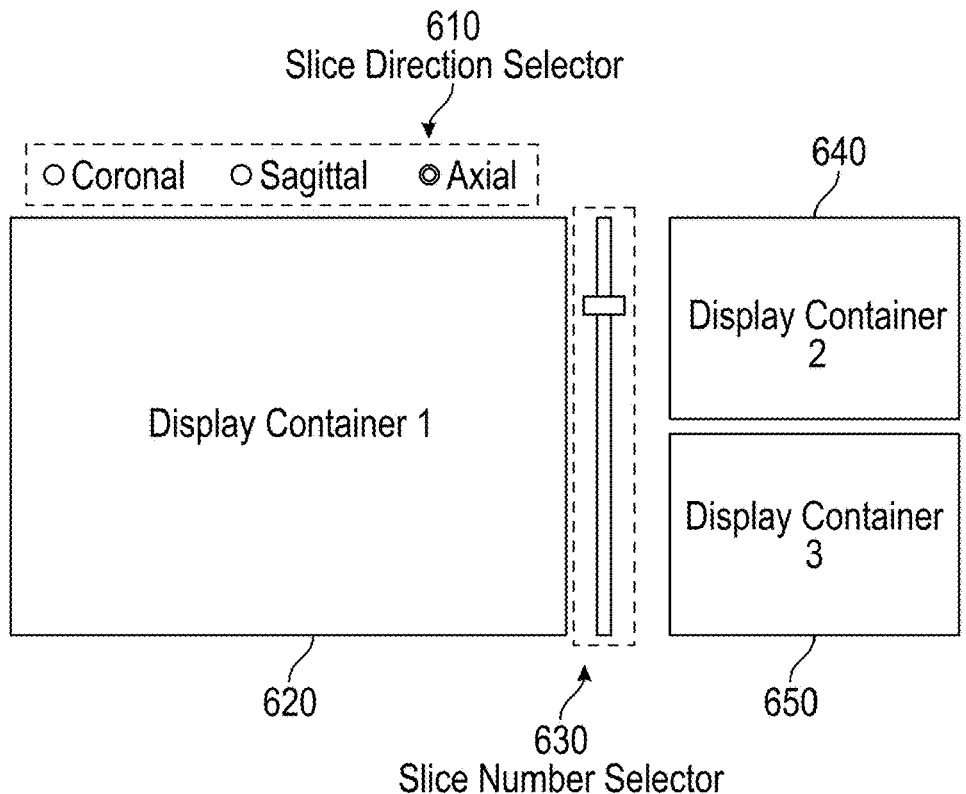
FIG. 7 is an embodiment of the display on a user terminal.

FIG. 7 shows an embodiment of the display on the user terminal 102. The display may be in a web page accessed through a web browser although other programmes or viewing means may also be used. In preferred embodiments Javascript™ is used however Python™ or Ruby™ are also suitable. The user terminal receives the combined images and any associated data. FIG. 7 shows 3 display containers 620, 640 650 in which portions of the combined image may be displayed. A number of widgets 610 630 allowing or controlling user interaction with the user terminal 102 may also be present. Alternatively control may be achieved through a keyboard, mouse or other interactive devices. The presence of the three display containers means that the embodiment of FIG. 7 is suited to a set of three combined images, representing three directions (preferably orthogonal direction). It will be understood that greater or fewer display containers may be used.

Figure 8:
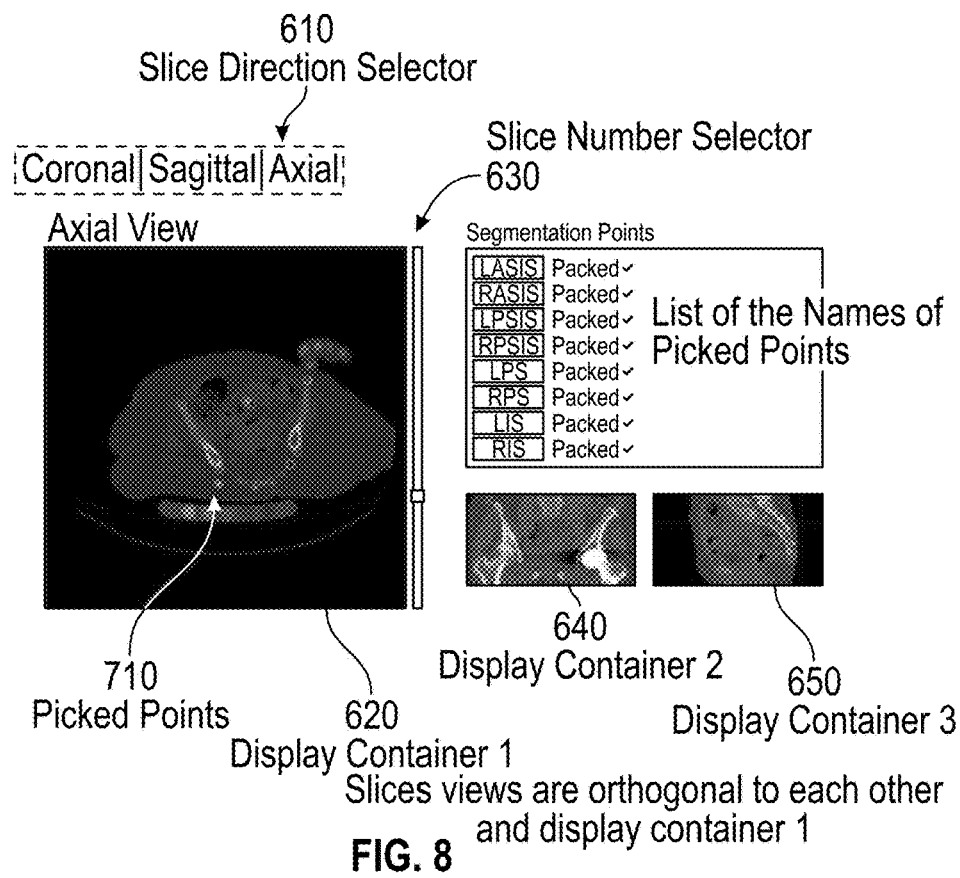
FIG. 8 is a second embodiment of the display on a user terminal.

FIG. 8 shows an embodiment similar to that of FIG. 7 in which images are present. The display containers 620 640 650 may be of any size but in the shown in embodiment one large display container 620 is used with two ancillary display containers. The main display container is used to provide the ability to run through the series of images on the user terminal, for example by use of the arrow keys or slice number selector 630. Display container 640 and 650 may also be used for this purpose, however more often they display a fixed image. This may be a representative image but is preferably an image relating to an alternative axis or direction of image slices. The series of images on display may be rotated by a widget such as slice direction selector 610. The slice number selector widget 630, or other means, allows a user to quickly scroll between images. Because a single image is required and already loaded this process is relatively fast. FIG. 8 also demonstrates that the user interface may be used to list picked points or provide further information to the user.

Figure 9:
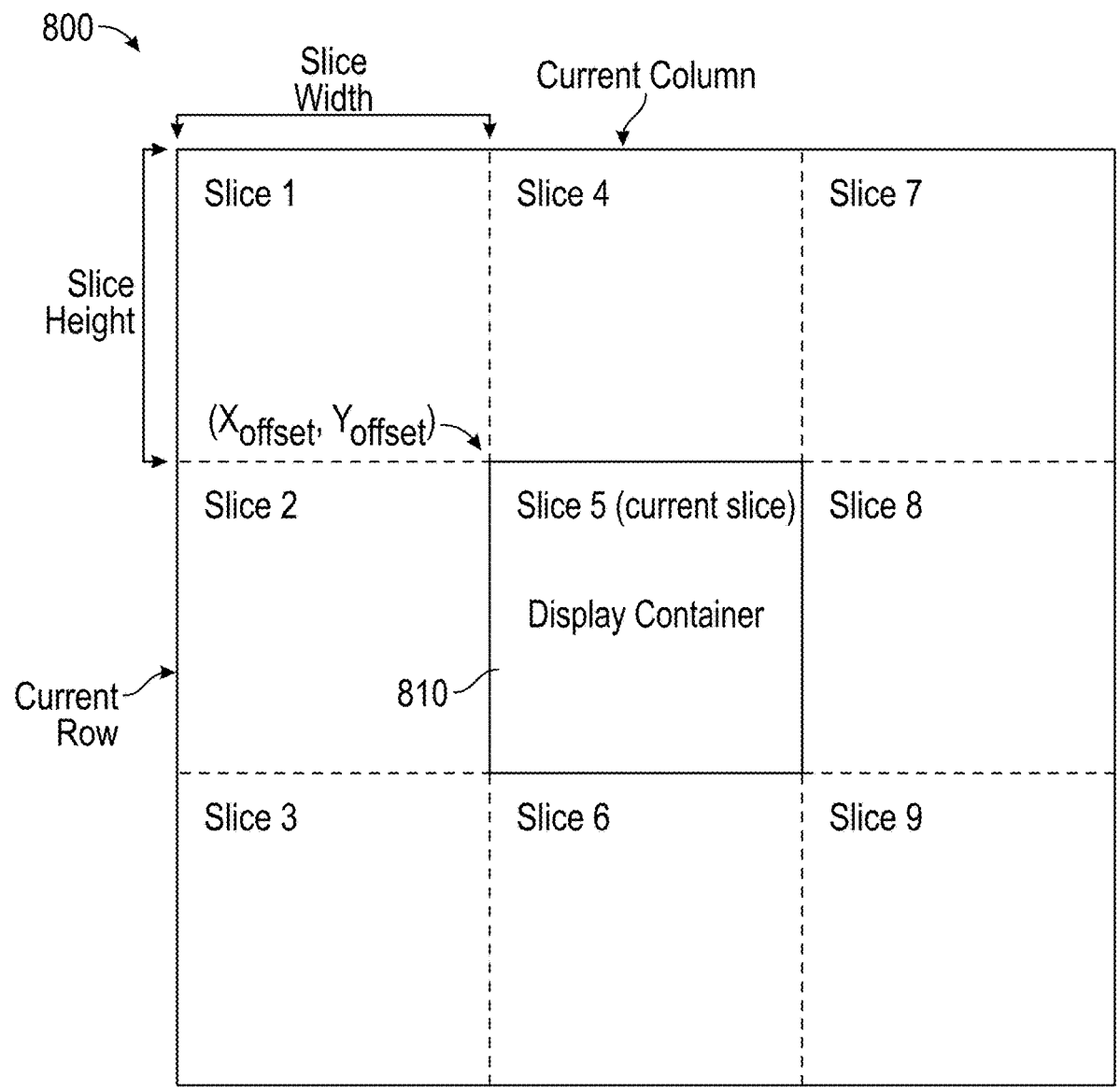
FIG. 9 shows an embodiment of the display of a portion of the combined image on the user terminal.

FIG. 9 demonstrates the operation the user terminal to move between image slices. The combined image 800 is composed of a plurality of image slices which have been combined together. The display container 620 of the user terminal 102 displays a portion 810 of the combined image 800. The portion represents at least a substantial part of a single image and preferably only a single image. In some embodiments a plurality of images are presented, but there is an advantage where a single image is presented because this provides the user the ability to scroll through the images. Because only a part, in this case a single image slice 810, is shown in the display container 620 the user terminal must be able to track the flow of images and translate the combined image in the display container so the correct image slice is displayed. It will be understood that although it is discussed here in terms of the combined image being moved or translated relative to the display container it could alternatively be understood in terms of any relative movement.

The user terminal is able to display any provided slice of the combined image 800 in the display portion 620. This is controlled by a method or algorithm which selects the relevant portion of the combined image to display. In a preferred embodiment the user terminal first checks that the combined image 800 matches the user selected slice direction (for instance the combined image is aligned on the correct orthogonal directions or axis). The user terminal can then separate the combined image into separate slices by their positions in the combined image. Preferably this is easy to achieve because the image slices are of constant size and suitable details have been provided to the user terminal. However if this is not available the user terminal may attempt to calculate the size of the images, or identify images based on images processing including identifying border regions or spaces between images. In some embodiments the combined image may have additional features which can be used to enhance this process, such as borders or lines.

In a preferred embodiment the server 101 provided slice height h and slice width w, give a ratio of the image. This is used to determine the dimension of the main display container; however the images can also be scaled and/or cropped to fit if necessary. The image ratio may also be used to dynamically resize the display containers whenever the user terminal display, or display container is resized. The user terminal can then calculate the number of rows and columns of image slices there are in the combined image Is:

rows=height($I_s$)/h columns=width($I_s$)/w

The method then calculates a reference point for the image slice. For example the reference point may be the position $(x_{\mathit{offset}}, y_{\mathit{offset}})$ of the top-left corner of the slice in $I_s$. This point can be used to calculate the position of the image slice within the combined image:

$$\text{column} = \text{ceiling}\left(\frac{n-s+1}{\text{rows}}\right)$$
$$\text{row} = (n_s - s + 1) - (\text{rows} \times (\text{column} - 1))$$
$$x_{\mathit{offset}} = -w \times (\text{column} - 1)$$
$$y_{\mathit{offset}} = -h \times (\text{row} - 1)$$

After calculating the image slice position the combined image 800 can be translated by $(x_{\mathit{offset}}, y_{\mathit{offset}})$ relative to the main display container so only the currently selected slice is visible in the display container 810. This process enables a single call of the combined image(s) to be performed. Selection of the desired image is simply a translation of the already loaded image. In this way the user terminal has a simple and fast action to perform instead of any delay with the communication. Furthermore no difference in action is seen by a user, the new image loads. The speed at which this can take place enables a user to quickly scroll through the images with low latency, assisting the understanding of the 3D image with the 2D slices.

A similar approach can be applied for any overlays 920 940 as shown in FIGS. 10 and 11 and described above. Any overlay combined images sent by the server can be displayed over the base image to show data such as 3-D model outlines over the base image of anatomy. The overlay combined images are created to have the same dimension and number of slices as the base image so that there is consistency between the combined imaged and the same offsets can be used. For any slice of the base image at a particular slice direction, a corresponding slice of one or more overlay images can be rendered over the base image slice. The overlay may have a number of characteristics, such as shadings or levels of detail which can be included if necessary.

The user terminal 102 generally provides the user an interface, such as a widget or a multi-selector (e.g. checkboxes, drop-down list) to allow selection of or showing/hiding of any one or more overlay layers. More than one overlay layer can be visible at once. Additionally, the user can rearrange the overlay layer order and bring desired layers to the foreground. This can be achieved by either selecting the desired layer and moving it through the overlay stack using "up" and "down" buttons or simply by selecting the layer and dragging to the desired position. Each overlay image may be rendered with different colour shading or transparency on the client-side to provide contrast over the base image or between each overlay layer.

In embodiments of the system the user terminal 102 allows the user to select points on a displayed image slice 710. This can be achieved using a pointing device. FIG. 8 shows an example implementation of the user terminal with points picked on a slice 710. Selection of multiple points enables the selection and/or display of lines and regions. In some embodiments these points are used simply as markers. However in embodiments the selected points are transmitted to the server 101. This allows the server 101 to perform image processing tasks on the full resolution 3-D image stack or prepare additional combined images.

In a particular embodiment the picked image points are translated using normalised co-ordinates. When a point with coordinates $(x_s, y_s)$ on an image slice is picked by the user, the client webpage or user terminal algorithm calculates normalised coordinates $(x_N, y_N, z_N)$ defined as $$x_N = \frac{x_s}{w}$$
$$y_N = \frac{y_s}{h}$$
$$z_N = \frac{i}{n}$$

The normalised coordinates are sent to the server which converts them into voxel coordinates for the full resolution image stack using information about the full stack width, height, and depth which is stored on, or available to the server. In some cases where interpolation has taken place the position may have to be checked, for instance by sending a confirmation image (being an original of the image series or otherwise) to the user terminal. The 2-D coordinates and slice number do not need to be communicated since the image stack has been down-sampled during the compression process, as described above.

In a particular embodiment a user may want to define a region within the image stack to focus the image (e.g. on an object) and view the region at a higher or full resolution. This may be selected by the user in the user terminal and communicated to the server. Then the server can be adapted to prepare or form a further combined image focusing on the region of interest. In a particular embodiment a user picks at least two points. The two points are preferably at the diagonally opposing corners of the region of interest although other means for selecting regions are known. The normalised coordinates of these points are sent to the server which converts them into real world coordinates using the image stack metadata. The server can then generate a new sampling grid that spans the rectangular volume between the two points. In preferred embodiments this narrows the focus of the sampling grid to provide higher accuracy Similar changes can be made to any overlays. The series of images or image stack is then sampled using the new sampling grid, combined in one or more orthogonal directions of the grid, and sent back to the user terminal for display or visualisation. The user-defined region of interest (ROI) can be stored on the server in terms of the 2 picked point coordinates and the generated combined image. These two pieces of data can be associated with the particular user or available to all users. In the future this user(s) can select from previously defined ROIs. In some embodiments multiple ROIs may be communicated to the user terminal to enable a comparison to be made.

In a further embodiment the user may pick points to define a new direction for slicing the image stack. This is useful, for example, when the image axes are not aligned with some anatomical axis of an object of interest, such as a limb or bone. Re-slicing the image stack and regenerating anatomical-axis-aligned stitched images will aid the user in analysing the image. The user would first pick at least three points on the object of interest, typically anatomical landmarks. The normalised coordinates of these points are sent from the user terminal 102 to the server 101 which converts them into real world coordinates using the image stack metadata. The server 101 calculates an origin and three orthogonal vectors from the real world of the selected points or coordinates. The calculations are preferably based on definitions of anatomical coordinate systems. The user may select multiple points for different reasons. For instance: picking two points can be used to take a linear distance measurement between the points; picking 3 points can be used to take an angular measurement; and/or picking a number of anatomical landmarks can be used as a part of image segmentation or registration algorithms.

For example, given three points, p1, p2, p3, the midpoint of p1 and p2 can be defined as the origin. The vector from the origin to p3 can be defined as the first vector v1. The cross product of v1 with the vector from the origin to p1 can be defined as the second vector v2. The cross product of v1 and v2 can be defined as the third vector. These three vectors provide the axes of the image. In some embodiments image processing on the server may be used to ensure the plane is aligned with a feature of the series of images. The server 101 then generates a new sampling grid which aligns with the calculated points and vectors centred about the origin. In some embodiments the extent of the grid from origin can be limited by the coordinates of the picked points, thereby also defining a region of interest based on the object of interest. The series of images or image stack is then sampled using the new sampling grid, combined or stitched in the three orthogonal directions of the grid, and sent back to the user terminal for display or visualisation. The user-defined slice orientation can be stored on the server in similar ways to the ROI.

Figure 2:
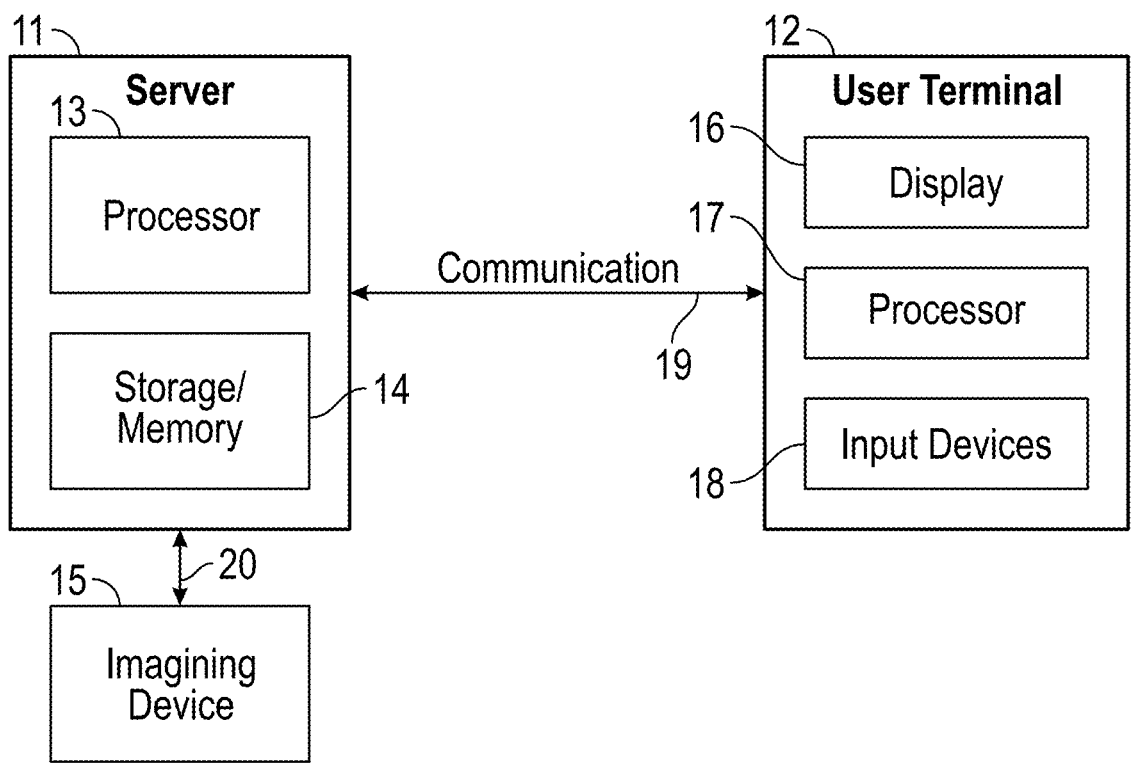
FIG. 2 is an overview of an embodiment of the system of the server and user terminal.

Those skilled in the art will appreciate that the methods described, or parts thereof, are intended to be performed by general purpose digital computing devices, such as desktop or laptop personal computers, mobile devices, servers, and/or combinations thereof communicatively coupled in a wired and/or wireless network including a LAN, WAN, and/or the Internet. As shown in FIG. 2 the system is preferably implemented using a processor in a server 11 in communication 19 with a user terminal 12. However the system may be applicable to other forms of communication between or within devices. The processor means or processors 13 17 may be a GPU, FPGA, digital signal processor (DSP), microprocessor, logical device or other processing means. The system may also comprise an image capture device 15 in communication 20 with the server including through a user terminal. Exemplary medical devices include MRI images, ultrasound, CT scans, microscope images and satellite images. The server 11 preferably has, or is connected to a storage 14 or memory means or device. The user terminal 12 has a display 16, a processor 17 and preferably an input device 18.

Figure 12:
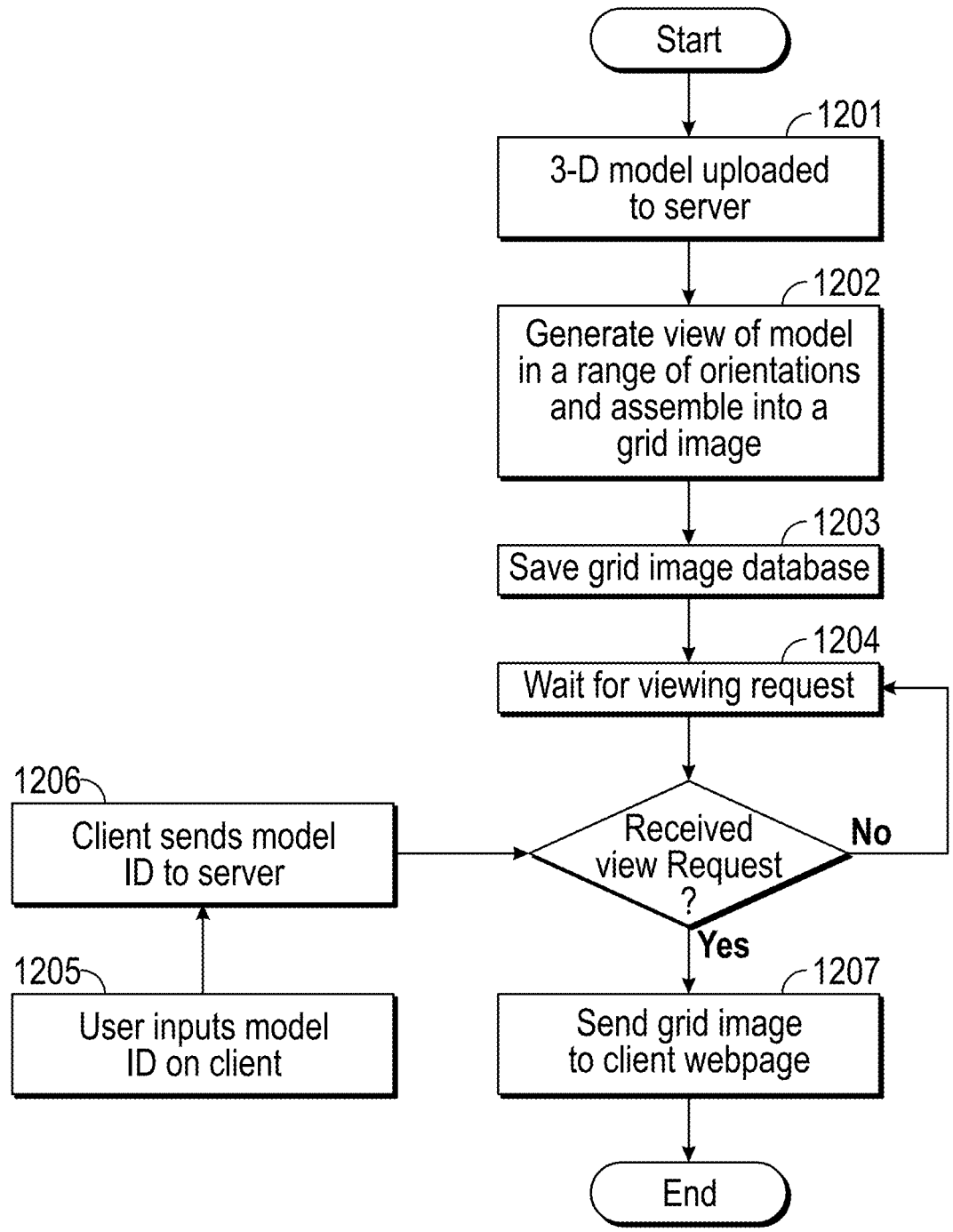
FIG. 12 is flow diagram of another embodiment of the functionality of the server component.

As broadly described above, in another example the system can allow remote interactive viewing of 3-D models in a variety of orientations without transmitting the 3-D model itself. The description below in connection with this example should also be read in conjunction with the disclosure above. The implementation of the system according to this example is composed of:
A remote server 101 (again as shown in FIG. 1) that in this example generates grid images of 3-D models. The server also stores a database of 3-D models and their pre-generated grid images.
An interactive webpage rendered on a client device 102. The webpage contains algorithms for the user to request, view, and manipulate views of a 3-D model.
3-D models may be provided to the server via the client webpage or through other means. The server functionality in this example is shown in FIG. 12. Referring to FIG. 12, the model is uploaded to the server in step 1201, the views are generated in step 1202 and the server generates a grid image of views of the model as will be described further below. The grid image is saved to a database at step 1203, after which the server awaits a viewing request at 1204.

The client webpage enables a user to browse the database of 3-D models by their names or some other form of ID, and select a model as shown at 1205. The client sends the selected model ID to the server at 1206. The server then sends the model's grid image and grid image information at 1207.

Figure 13:
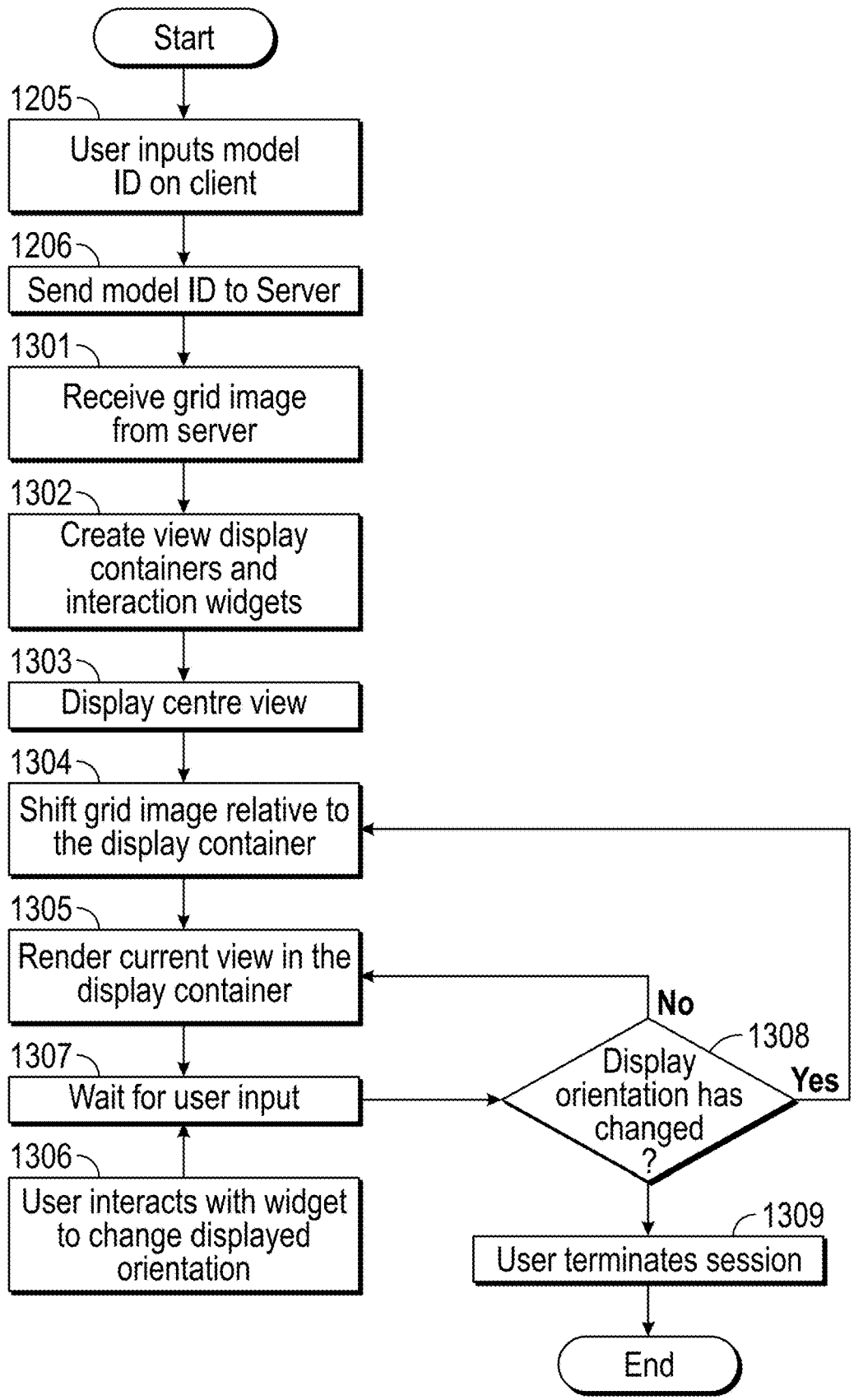
FIG. 13 is a flow diagram of another embodiment of the functionality of the user terminal.

FIG. 13 shows the client side functionality. Referring to that Figure, the model's grid image and grid image information is received at step 1301. Once received, the webpage will create view display containers and interaction widgets (1302) and display a centre view of the grid in step 1303.

The system waits for the user input to view in the grid image based on user input of model orientation in 1307. The user interacts with a widget or other application running on the client at 1306 in order to change the view i.e. to change the displayed orientation in accordance with this example. If the user input 1308 doesn't require a change of view then the current view is rendered in the display container at 1305. If the user requests a change of view, then the grid image is shifted relative to the viewing window or display portion at 1304. The user session is terminated at 1309.

Creation of the grid image, rendering of the image to a user, and user selection of views from the grid image will now be described.

Figure 14:
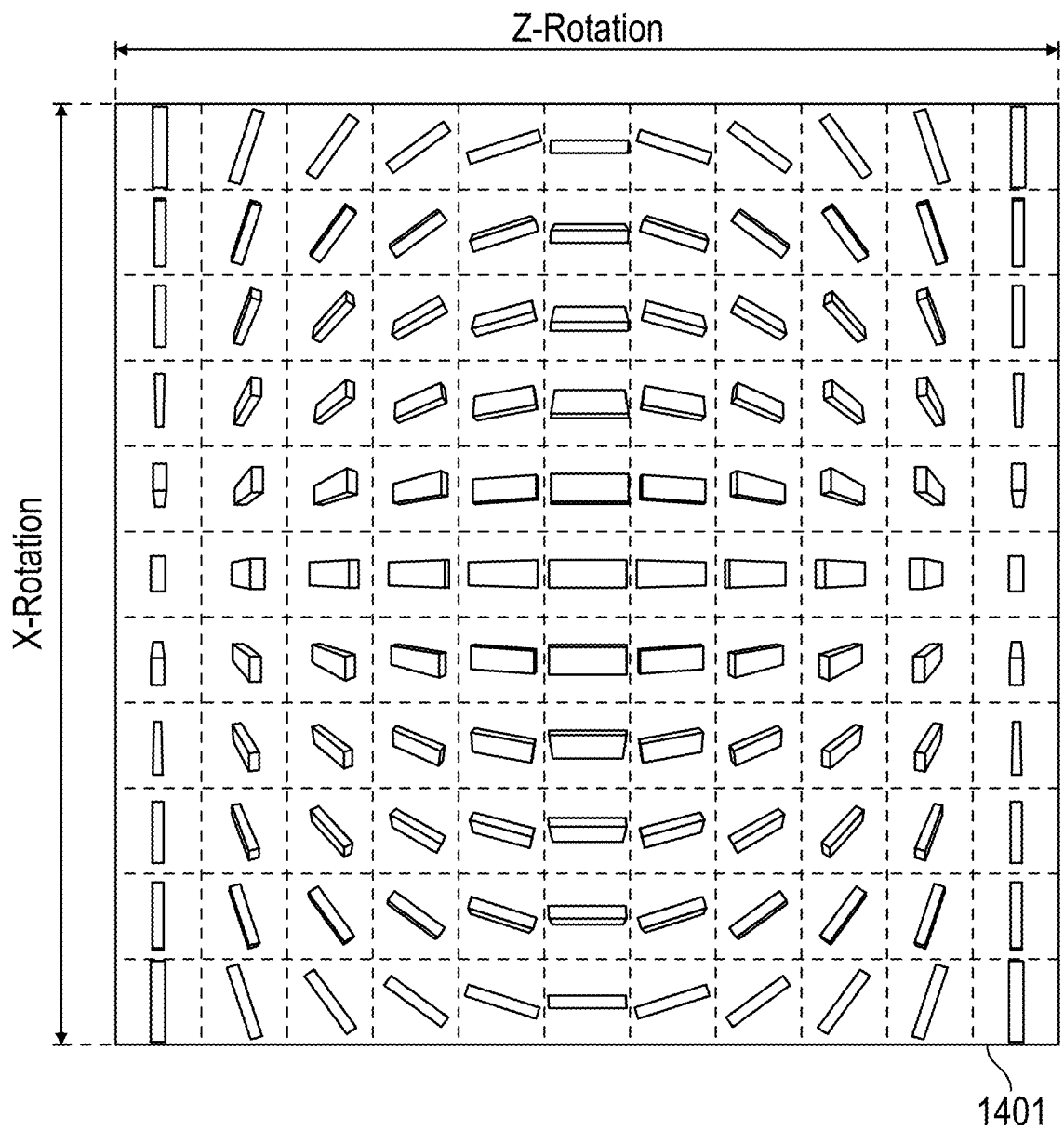
FIG. 14 shows another example of an image grid.

FIG. 14 shows an example of a grid image 1401. A 3-D model (surface or volume) is pre-rendered at a series of orientations separated by rotations along two axes, X and Z. For example, the orientations can be from −90 to +90 degrees about the Z axis in 11 intervals, and similarly along the X axis, resulting in 121 views which are shown separated by broken lines in FIG. 14. This operation can be represented in pseudo-code by:

```
for p in range(p_min, p_max, rows          ):
    for q in range(q_min, q_max, columns        ):
        render_model(p,q)
    end
end
```

The angle ranges can be arbitrarily defined with some preferred values: −90 to +90 allows the front half of an object to be viewed. −180 to +180 degrees allows all sides of the object to be viewed. The number of angles along each axis (and therefore the rows and columns of the grid image) can also be arbitrarily defined.

The pre-rendered images are then assembled into a single image composed of the views in a grid layout 1401. Each row contains views with the same rotation along one axis and each column contains views with the same rotation in the other axis as shown in FIG. 14. This grid image is sent to the client along with the following information:
number of grid rows and columns,
the width and height of each view in pixels,
and the maximum and minimum rotation angles along each axis.

Figure 15:
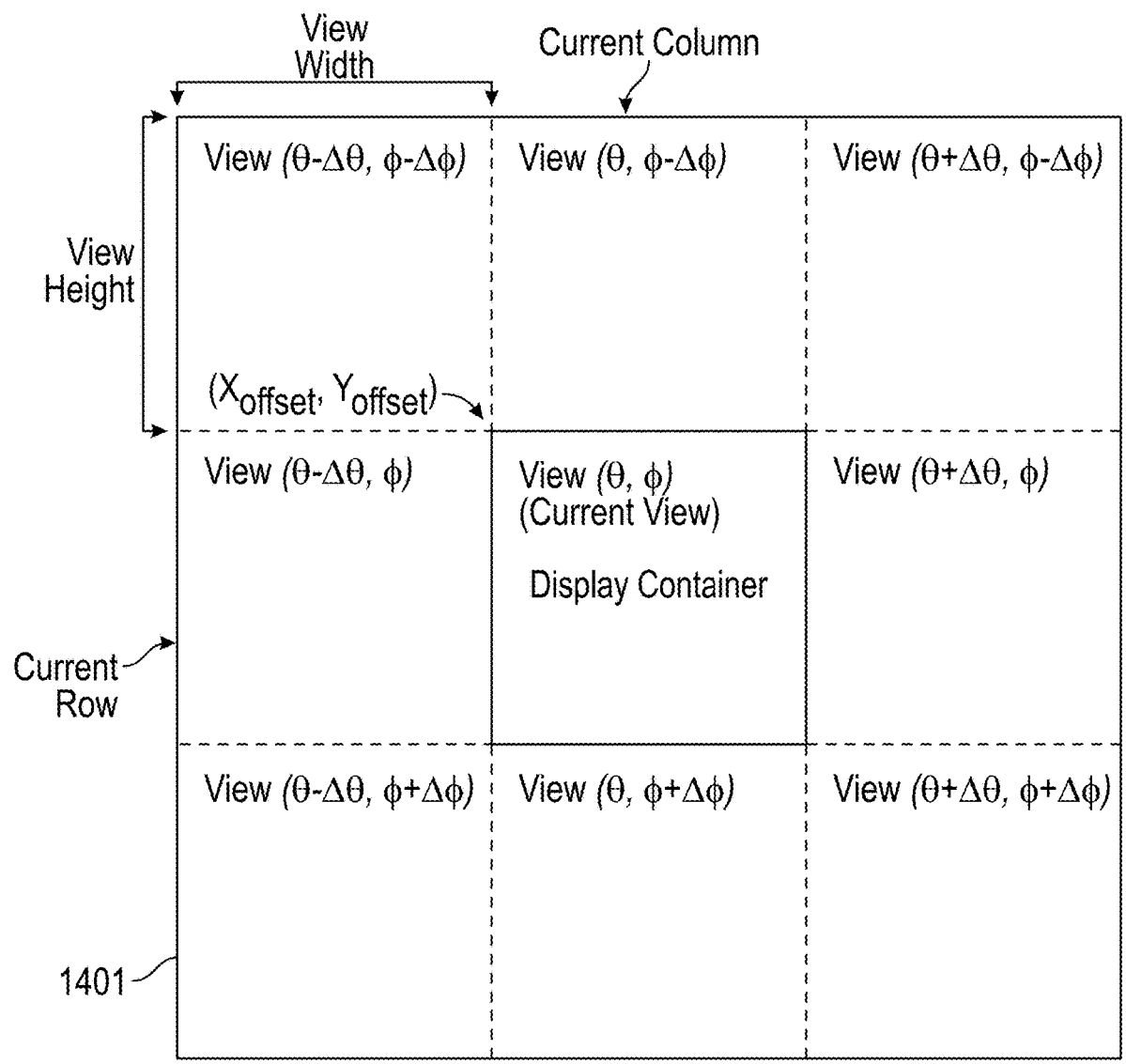
FIG. 15 shows a diagram illustrating rendering a view from the image grid of FIG. 14.

The grid image 1401 is rendered on the client-side in a similar way to the image stack example described earlier in this document for 3-D images. A single view from the grid image 1401 is visible in a viewing window or display container 1501 (FIG. 15). An application (e.g. a widget) is provided to allow the user to scroll through the views to select the view of interest.

Figure 16:
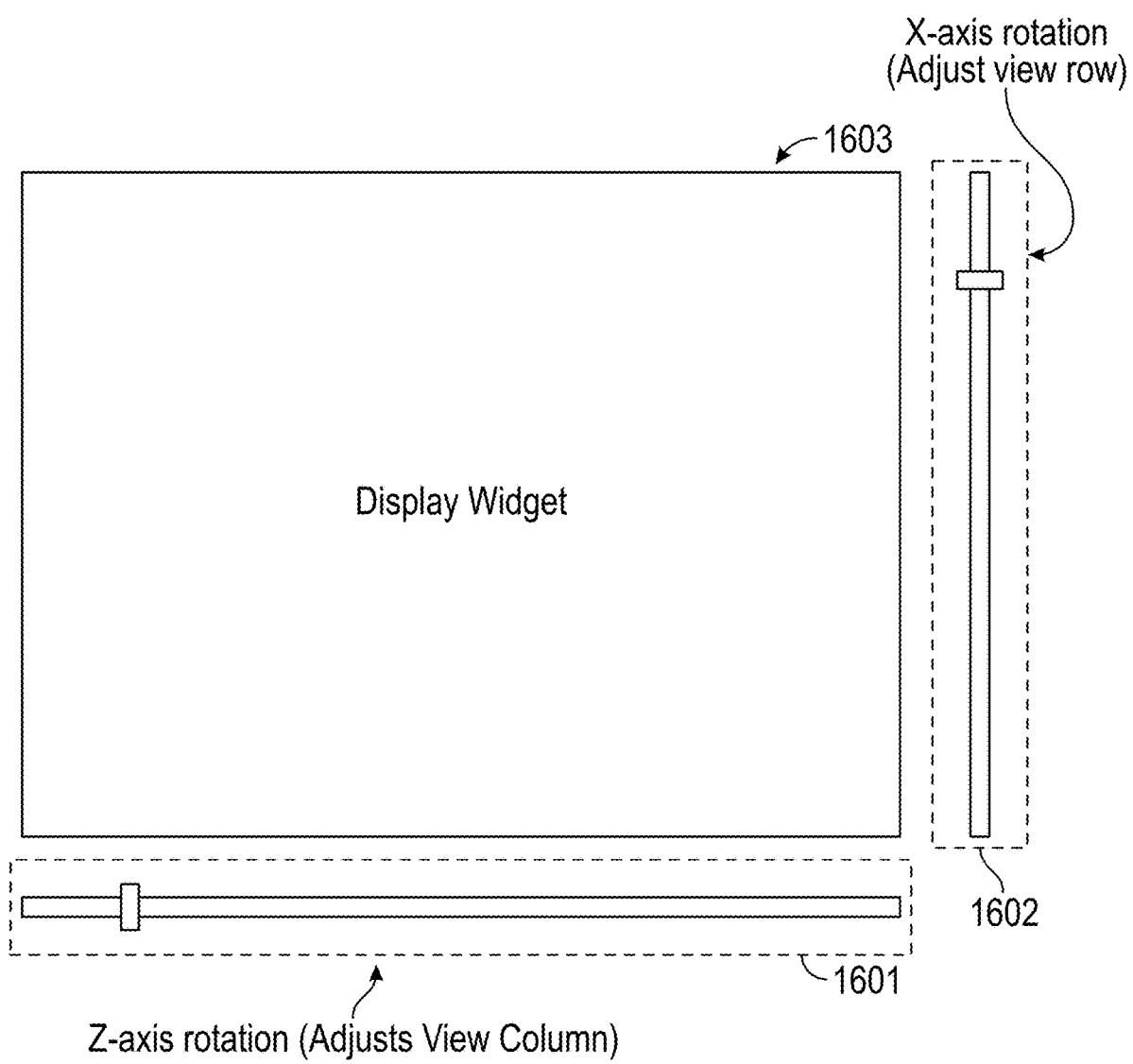
FIG. 16 shows a diagram of an application used to select a view of the grid image of FIG. 14 for display.

A particular implementation can involve a display widget 1603 (FIG. 16) having 2 scroll bars, one horizontal 1601, one vertical 1602. Scrolling each scrollbar changes the grid image column (horizontal bar) and row (vertical bar) of the view shown in the display widget. Thus, scrolling along the scroll-bars simulates rotating the 3-D model along 2 orthogonal axes. The client webpage may contain 1 or more display containers to show the same model in multiple axes of rotation (e.g. one container for x and z axis rotation, another container for y and z axis rotation), or multiple models.

Given a user selected model orientation (e.g. selected using the scrollbars), the client algorithm selects a region of the grid image to display in the display container (FIG. 15):

1. Using the server-provided view height h and width w, get the aspect-ratio of the view, which will be used to determine the dimension of the main display container. We also use the aspect-ratio to dynamically resize the display container whenever the browser's window is resized.
2. If not provided by the server, calculate the number of rows and columns of image slices there are in the grid image I.

$$\text{rows} = \text{height}(I)/h$$

3. columns=width(I)w From the user selected orientation, calculate the position ($x_{offset}$, $y_{offset}$) of the top-left corner of the view in I.

$$\text{column} = \text{round}\left(\frac{\theta - \theta_{min}}{\Delta\theta}\right), \text{ where } \Delta\theta = \frac{\theta_{max} - \theta_{min}}{\text{columns}}$$

$$\text{row} = \text{round}\left(\frac{\phi - \phi_{min}}{\Delta\phi}\right), \text{ where } \Delta\phi = \frac{\phi_{max} - \phi_{min}}{\text{rows}}$$

$$x_{offset} = -w \times (\text{column} - 1)$$

$$y_{offset} = -h \times (\text{row} - 1)$$

4. Translate I by ($x_{offset}$, $y_{offset}$) relative to the display container so only the view matching the currently selected orientation is visible in the display container.

An alternative method of changing view is via interpreting user click-drag actions on the display container. This method is more intuitive and closer to the standard method of interactive with a 3-D model.

1. Define an angle per pixel-dragged. This is defined in the client-webpage algorithm and not user adjustable.
2. While the user is click-dragging, convert the horizontal and vertical pixels dragged ($p_x$, $p_y$) into column and row displacements $$\Delta col = \text{round}\left(\frac{p_x \alpha}{\Delta\theta}\right), \text{ where } \Delta\theta = \frac{\theta_{max} - \theta_{min}}{\text{columns}}$$

$$\Delta row = \text{round}\left(\frac{p_y \alpha}{\Delta\phi}\right), \text{ where } \Delta\phi = \frac{\phi_{max} - \phi_{min}}{\text{rows}}$$

3. Calculate the new column and row to show and the corresponding ($x_{offset}$, $y_{offset}$)

$$\text{column} = \text{column}_{current} + \Delta col$$

$$\text{row} = \text{row}_{current} + \Delta row$$

If the maximum and minimum rotation angles are 180 and −180 degrees respectively, and if the new column or row is less than 1 or greater than the number of columns or rows, the column or row will wrap around, i.e.

$$\text{column} = \begin{cases} 1, & \text{if } (\text{column}_{current} + \Delta col) > \text{columns} \\ \text{columns}, & \text{if } (\text{column}_{current} + \Delta col) < 1 \\ \text{column}_{current} + \Delta col \end{cases}$$

And similarly for rows.

Translate I by ($x_{offset}$, $y_{offset}$) relative to the display container so only the view matching the currently selected orientation is visible in the display container.

The system can be used with either of the examples referred to above, so that 2-D images representing cross-sectional views along any axis of the 3-D model or volume can be provided along with 2-D images of a the 3-D model, object or volume, in any disposition, such as views showing the object in various angular orientations or dispositions about an axis of the 3-D model, object or volume.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A method for providing an image set representative of a 3-D volume from a server to a user terminal, the method comprising the steps of:
   receiving, by the server, a request from the user terminal for the image set;
   selecting, by the server, a set of 2-D images along an axis of the 3-D volume which axis is orthogonal to the 2-D images;
   combining, by the server, each 2-D image in the set of 2-D images into a single combined 2-D image, wherein the single combined image comprises a stitched array of the 2-D images; and
   transmitting, from the server to the user terminal, the single combined image to be processed at the user terminal and image information that enables the user terminal to identify each of the 2-D images from the single combined image.

2. The method as claimed in claim 1 wherein the set of 2-D images is derived from a 3-D volume or 3-D model.

3. The method as claimed in claim 1 further comprising combining each of the 2-D images in the set in a sequential manner.

4. The method as claimed in claim 1 further comprising the step of image stitching the 2-D images in the set of images to form the combined 2-D image.

5. The method as claimed in claim 1 further comprising forming a voxel array from an original series of images, and obtaining the set of 2-D images from the voxel array.

6. The method as claimed in claim 5 wherein the voxel array represents a 3-D volume having a plurality of axes, and the method further comprises obtaining the set of 2-D images along each axis.

7. The method as claimed in claim 5 further comprising sampling the original series of images prior to obtaining the combined image in order to reduce the size of the combined image.

8. The method as claimed in claim 5 further comprising sampling the voxel array to obtain the set of images in order to reduce the size of the combined image.

9. The method as claimed in claim 5 further comprising selecting a plurality of 2-D images from the voxel array and interpolating between the plurality of 2-D images from the voxel array to obtain the set of 2-D images.

10. The method as claimed in claim 1 wherein the image information comprises a demarcation feature in the combined image for demarcating individual 2-D images in the set of 2-D images.

11. The method as claimed in claim 10 wherein the demarcation feature comprises one or more of:
   a separation device;
   a 3D model outline;
   an indicator; or
   a reference number.

12. The method as claimed in claim 1 further comprising configuring the combined image to be a square.

13. The method as claimed in claim 1 further comprising adding an overlay to the set of images.

14. The method as claimed in claim 13 wherein the overlay is applied to a 3-D model prior to obtaining the set of 2-D images.

15. The method as claimed in claim 1 further comprising providing transmitting information relating to the combined image to the user terminal.

16. A processing apparatus for providing an image set representative of a 3-D volume from a server to a user terminal, comprising:
   a processor; and
   a memory communicatively coupled to the processor and storing instructions, the instructions when executed by the processor cause the processor to:
      receive a request from the user terminal for the image set;
      select a set of 2-D images along an axis of the 3-D volume which axis is orthogonal to the 2-D images;
      combine each of the 2-D images in the set of 2-D images into a single combined 2-D image, wherein the single combined image comprises a stitched array of the 2-D images; and
      transmit, to the user terminal, the single combined image to be processed at the user terminal and image information that enables the user terminal to identify each of the 2-D images from the single combined image.

* * * * *